US006981000B2

(12) United States Patent
Park et al.

(10) Patent No.: US 6,981,000 B2
(45) Date of Patent: Dec. 27, 2005

(54) CUSTOMER RELATIONSHIP MANAGEMENT SYSTEM AND OPERATION METHOD THEREOF

(75) Inventors: Sang Kap Park, Seoul (KR); Young Pyo Bae, Seoul (KR); Jeong Yeol Park, Seoul (KR); Jeong Ha Kim, Seoul (KR); Seong Nam An, Kyonggi-do (KR); Sung Guen Kang, Seoul (KR); Min Sook Han, Seoul (KR); Pan Ju Kim, Gwangju-shi (KR); Chang Won Kang, Gwangju-shi (KR); Hee Chul Kwak, Gwangju-shi (KR); Yoon Woo Choi, Gwangju-shi (KR); Yeong Seok Jo, Daegu-shi (KR); Sun Joo Kim, Seoul (KR); Jin Seok Oh, Daegu-shi (KR)

(73) Assignee: LG Electronics Inc., Seoul (KR)

( * ) Notice: Subject to any disclaimer, the term of this patent is extended or adjusted under 35 U.S.C. 154(b) by 610 days.

(21) Appl. No.: 09/893,688

(22) Filed: Jun. 29, 2001

(65) Prior Publication Data

US 2002/0010705 A1     Jan. 24, 2002

(30) Foreign Application Priority Data

| Jun. 30, 2000 | (KR) | .............................. 2000-37254 |
| Nov. 23, 2000 | (KR) | .............................. 2000-69916 |
| Dec. 21, 2000 | (KR) | .............................. 2000-79646 |

(51) Int. Cl.$^7$ ............................................. G06F 17/00
(52) U.S. Cl. ...................... 707/104.1; 707/10; 715/708
(58) Field of Search ....................... 707/10, 1–3, 104.1; 705/1, 8–11, 7; 379/265, 266; 715/708–709

(56) References Cited

U.S. PATENT DOCUMENTS

| 5,764,953 | A | * | 6/1998 | Collins et al. ................. 703/17 |
| 5,848,403 | A | * | 12/1998 | Gabriner et al. .............. 706/13 |
| 5,895,450 | A | * | 4/1999 | Sloo .............................. 705/1 |
| 5,943,652 | A | * | 8/1999 | Sisley et al. ................... 705/9 |
| 5,956,024 | A | * | 9/1999 | Strickland et al. .......... 345/717 |
| 6,020,883 | A | * | 2/2000 | Herz et al. ................... 345/721 |
| 6,240,405 | B1 | * | 5/2001 | Suzuki ........................ 706/45 |
| 6,311,162 | B1 | * | 10/2001 | Reichwein et al. ............ 705/1 |
| 6,327,574 | B1 | * | 12/2001 | Kramer et al. ................ 705/14 |
| 6,349,290 | B1 | * | 2/2002 | Horowitz et al. ............. 705/35 |
| 6,389,400 | B1 | * | 5/2002 | Bushey et al. ................. 705/7 |
| 6,430,496 | B1 | * | 8/2002 | Smith et al. ................ 701/117 |
| 6,587,851 | B1 | * | 7/2003 | Ditcharo et al. ............... 707/6 |
| 2002/0065700 | A1 | * | 5/2002 | Powell et al. .................. 705/9 |
| 2002/0087385 | A1 | * | 7/2002 | Vincent ....................... 705/10 |
| 2002/0174182 | A1 | * | 11/2002 | Wilkinson et al. .......... 709/205 |
| 2003/0069797 | A1 | * | 4/2003 | Harrison ...................... 705/26 |

* cited by examiner

*Primary Examiner*—Hosain Alam
*Assistant Examiner*—Brian Goddard
(74) *Attorney, Agent, or Firm*—Fleshner & Kim, LLP

(57) ABSTRACT

Disclosed is a customer relationship management system and operation method thereof that enables a technician to seize the customer's satisfaction and sensitivity with respect to respective service providers, perform reception of the corresponding customer based on the seized information, register the seized information in a database, and perform a service using a proper reception for the corresponding customer after confirming the sensitivity of the customer. According to the customer relationship management system and operation method, the customer can directly select the technician, and thus remove the uneasy feeling caused by a strange visitor. Also, by confirming again the customer's satisfaction with the service after completion of the service providing, the reliability of the service with respect to the customer is improved.

40 Claims, 27 Drawing Sheets

FIG.5A

| type | Code | particulars |
|---|---|---|
| positive (B) | B1 | visit at technician's convenience |
| | B2 | customer is kind |
| | B3 | praising the technicians |
| | B4 | praising receptionist |
| | B5 | praising LG company |
| | B6 | praising LG products |

FIG.5B

| type | Code | particulars |
|---|---|---|
| expected (Y) | Y1 | request prompt visit |
| | Y2 | require excellent technician |
| | Y3 | authoritative |
| | Y4 | affiliated company/relatives |
| | Y5 | LG fan |
| | Y6 | those who are on welfare |
| | Y7 | senior citizens organizations |
| | Y8 | take pride in old aged LG product |
| | Y9 | request low cost |
| | YA | warranty term issues |
| | YB | poor understanding |
| | YC | request exact time |
| | YD | at his/her own will |
| | YE | expecting good service |

FIG.5C

| type | Code | particulars |
|---|---|---|
| negative (R) | R1 | request the time which is not available on time table |
| | R2 | repetitive trouble |
| | R3 | technical problem |
| | R4 | costs |
| | R5 | dissatisfied with telephone reception at 1588 |
| | R6 | hard to connect the line |
| | R7 | quick tempered character |
| | R8 | promise/trust |
| | R9 | hard-grained character |
| | RA | request another technician |
| | RB | distrust the products |
| | RC | parts issues |
| | RD | problems with signing up the customer |
| | RE | long repair history |

| Code | Customer Type | Answering Contents | | |
|---|---|---|---|---|
| | | Answering Attitude | Essential words | Optional words |
| Y1 | Requesting a quick visit | Be sorry | We apologize to you again for not being able to visit you promptly | We will try our best not to trouble you later again. |
| Y2 | Requesting a excellent technician | Cautiously Discreetly | Was the technician Kind enough, Mr.(Miss/Mrs.) 00? | Thank you(Sorry). We will try to be more kind. |
| Y3 | Authoritative | Respectfully | Was the technician Kindly repair enough, Mr.(Miss/Mrs.) 00? | We sent you one of the excellent technicians, so didn't you have anything inconvenient or unpleasant? We will try more to do our best. |
| Y4 | Normal | Pleasantly | Was the technician Kind enough, Mr.(Miss/Mrs.) 00? | We will try more to satisfy you |
| Y5 | LG Fan | Understandingly | Thank you very much for loving LG | We know you love LG. We will try our hardest. |
| Y6 | Affiliated Company / Relative | As if he/she were my family member | Does any of your family work for LG group? | We asked the technician to give you special care... Thank you (Sorry). We will try more. |
| Y7 | Those who are on welfare /Senior Citizens organizations | Be ready to help in mind | We asked the technician to give you special service, did the technician provide you with satisfactory service? | We will try much more to be helpful to you. |
| Y8 | Take pride in old aged product of LG | Gratefully | It is a really old product, but you have been using that product very well so far! | We hope that you will be able to use product even longer. |
| Y9 | Warranty Term issues | Be sorry | We are very sorry that we cannot help you in this issue | Now we hope that you will be able to use the product for a long time without problem. |
| YA | Request low cost | Be worried | I guess you were worried about the cost, correct? | Now we guess you are able to use the product for a long time without any more problem. |
| YB | Poor understanding | Understandingly | Did the technician explain the problem well to you? | Sorry. We will try to not trouble you again. |
| YC | Request Exact time | Be sorry | We are very sorry that we could not able to keep the appointment | Next time, we will try to be on time. |
| YD | Person who requested service isn't present for the repair | Try to promote LG | Did you get enough explanation from the person who was present during the service? | It would have been better if you were there. We are sorry about that |

FIG. 7B

| Code | Customer Type | Answering Contents | | |
|---|---|---|---|---|
| | | Answering Attitude | Essential words | Optional words |
| B1 | Visit at your convenience | With appreciation | Thank you for your concern | We will try our best to check |
| B2 | Kind Customer | pleasantly | Thank you for your kindness | We will try to be more kind |
| B3 | Compliments our technician | with appreciation | Thank you for complimenting our technician | We will convey your compliment to him/her. |
| B4 | Compliments receptionist | humbly | Thank you for your compliment | It feels like today will be such a good day due to you. |
| B5 | Compliments our company | with appreciation | Thank you for your compliment | We will try our best for an excellent repair |
| B6 | Compliments our company | with appreciation | Thank you for using our OO product | We will try our best for an excellent repair |

FIG.11

| Section | Answering Model |
|---|---|
| •Initial greetings | Hello! This is 000 at Digital LG |
| •Apology | Yeah...I guess you must have had trouble using 00 Product<br>We are very sorry to have troubled you using our LG product |
| •[Empathy] | Thank you for complimenting our company<br>We will try to do our best to meet your trust in our company.<br>You have a problem with 00 product in 00000 now, right?<br>(Reconfirm the problem) |
| •Actual client | Confirm the Telephone number/Name/Address (Repeat)<br>Oh, you have had received our service with 00 product before, correct?<br>Your name is a,b,c,.... And your address is a,b,c,...., correct? |
| •Additional Check | Do you have any other product to be checked besides the 00 product you have told us about?<br>Would you tell us when is the most convenient time for our technician to visit you? |
| •[Empathy] | Yes, we will try to visit you promptly. Oh, the technician is near<br>where you live right now, so he will be able to visit you at 00. Is it ok with you? |
| •Closing statement | This is counselor, 000. Thank you for calling us.<br>Have a nice day(weekend/afternoon/evening)! |

Notice
1. Please enter the exact name,zip code and telephone number for prompt service.
If there is any wrong information, please schedule service after revising the infomation at Change Member's Info
2. Please enter the exact product so that we can assign the appropriate technical expert to the specific product

- Name: Sung-Tae
- Tel: 02 - 2611 - 8355
- Zip code: 135 - 243
- Address: 4-504 Ku APT Kaepo-dong, Kangmam-gu, Seoul
- Cell Phone: 019 - 219 - 8367

- Product: TV
  If you are not sure, you don't have to enter the model Number
- Model No: CN-2901C
- Nature of Problem:
  - Screen Issues
  - Specific channel issues
  - Power source/Voltage issues
  - Remote control issues
  - Sound issues
- Problem Description:
- Dates Desired: 2000.08.30
- Times Desired: choose the first preference for appointment time
- Technician Desired: choose the first preference for appointment technician
- Message: You can enter a maximum of 70 letters in Korean

Available Time
- 16:20 J.H Moon
- 18:00 J.H Moon
- 18:00 Y.D won
- 18:50 J.H Moon
- 18:50 Y.D Won

More information
You can see the picture of the technician and recognize which service center he belongs to submit  cancel In case the warranty term expired or the problem is dye to the customer's negligence, the charges will be a home call charge of 7,500 won, plus labor and parts though the satisfaction level of the service expected by the customer is abruptly increased, the quality of the service provided by the respective company is improved with a uniform level.

CUSTOMER RELATIONSHIP MANAGEMENT SYSTEM AND OPERATION METHOD THEREOF

BACKGROUND OF THE INVENTION

1. Field of the Invention

The present invention relates to a customer relationship management system and the operation method thereof that enables a technician(repair person or service man) to seize the customer's satisfaction and sensitivity for respective service providers, perform reception of the corresponding customer based on the seized information, register the seized information in a database, and perform a service using a proper reception for the corresponding customer after confirming the sensitivity of the customer.

2. Description of the Related Art

Generally, respective service providers provide services requested by respective customers, and receive predetermined payments for the provided services.

The service providers may be enterprises for manufacturing and selling products, individual stores such as restaurants or shops, or other kinds of companies.

Also, the services provided by the service providers may be tangible services for such as general products, foodstuffs, etc., or intangible services for such as the guidance of sightseeing, repair of products, etc.

As described above, the general companies among the service providers, which manufacture and sales products, always seize and correct the dissatisfaction of the customers.

Especially, at present, the general companies are on the trend that they improve the customer's satisfaction, and hence lead the customers to purchase their products. For this, they operate their service centers, and make efforts to collect various kinds of information to provide the optimum services to the customers.

FIG. 1 is a flowchart illustrating a conventional method of operating a service center.

Referring to FIG. 1, the general customer relationship management and service center operation process will now be explained.

First, a receptionist of the service center continuously receives customer's inquiries about the products, dissatisfaction knacks, troubles of the products, etc., stores, and informs the particulars of the customer's requests to service performing agents located adjacent to the customer.

The respective service performing agent selects a technician based on the informed particulars, and let the technician (repair person or service man) visit the corresponding customer and provide the service. The service-performing agent stores a result of the service in the database, and informs the service center that the service has been performed.

The service center, which is informed of the service completion, makes a phone call to the customer who received the service to confirm whether the service is satisfied with the customer or to perform a satisfaction confirming service such as receipt of an additional request, and then stores such particulars in the corresponding database, so that the above process is repeated or the service for the corresponding customer is terminated.

However, the conventional service providing method operated as above has the following problems.

First, as shown in FIG. 2, although the satisfaction level of the service expected by the customer is abruptly increased, the quality of the service provided by the respective company is improved with a uniform level.

Specifically, in former days, the expected level of the service desired by the customer was relatively low and the customer's dissatisfaction did not exist or was very insignificant, but at present or in the future, the expected level of the service desired by the customer is abruptly heightened. Accordingly, the customer's dissatisfaction becomes greater as time passes.

In other words, it is required that the service is provided as much as the customer can be sufficiently satisfied with, but the technician, that actually provides the service, cannot sufficiently satisfy the customer because it has insufficient information on the particulars desired by the customer.

Especially, the current customer relationship management system simply receives the troubles of the products during the receptionist's consultation with the customer, but cannot separately manage the information on the customer's dissatisfaction realized by the receptionist, resulting in that the service provider cannot dissolve the customer's actual dissatisfaction.

That is, the customer's dissatisfaction is dissolved only in accordance with the capacity of the receptionist who received the service request.

Recently, since the damage of manpower/material is incurred due to the visit of uninvited quests disguised as the service providers, a typical customer is cautioned against a strange visitor, and thus the service provider has some difficulty in providing the corresponding service.

Also, since the service performing agent instructs the technician located most adjacent to the service requesting customer to perform the corresponding service, the amount of work to be performed by the respective technician becomes different, and this causes the technician also to be dissatisfied.

Also, though the satisfaction confirming service performed by the receptionist after the service providing is completed is the final service performed to improve the customer's satisfaction with the service, a number of receptionists for performing the service are additionally required, and in the customer's absence, the hit rate of calling is lowered to deteriorate its operation rate.

Specifically, considering that the conventional service for confirming the service satisfaction is only in dependence on the phone calls, the process for confirming the service satisfaction cannot be performed in case that the customer's phone (especially, portable phone) is in an off state, in case that the call connection is troublesome due to the customer's personal business and so on, or in case that the customer is not the actual beneficiary customer of the service.

Especially, the conventional satisfaction confirming service as described above is not in consideration of the customer's place, but is performed in a manner that only whether to provide the corresponding service is confirmed in the receptionist's subjective place.

SUMMARY OF THE INVENTION

Therefore, an object of the invention is to solve the problems involved in the related art, and to provide a customer relationship management system and the operation method thereof which can improve the customer's satisfaction by seizing the customer's sensitivity for a respective service provider, registering the seized information in a database, and performing a proper reception corresponding to the registered sensitivity of the corresponding customer when providing a service to the customer.

In addition, the present invention provides an operation method for the customer relationship management system that determines a reference sensitivity so as to seize the customer's sensitivity accurately, and register the seized customer's sensitivity in the database to use the information on the reception for the seized customer's sensitivity.

In order to achieve the above object, there is provided a customer relationship management system comprising a database for storing various kinds of sensitivity information classified by customers and encoded, behavior pattern information determined in correspondence with the encoded sensitivity classification, and information on service request particulars; and a server network constructed to include an information collection server for collecting information according to the service request particulars or satisfaction/dissatisfaction with the service from respective customers, and an information transfer server for selectively transferring the information stored in the database to terminals of respective technicians.

In another aspect of the present invention, there is provided a method of operating the customer relationship management system comprising a first operation step of a server network confirming service request particulars and a sensitivity of a customer if a customer's access for a service request is confirmed; a second operation step of the server network obtaining reception information for a classified type corresponding to the confirmed sensitivity of the customer; a third step of the server network receiving the service request of the corresponding customer as performing a reception based on the obtained reception information; and a fourth step of the server network registering the information requested by the customer in a database.

It is another object of the present invention to provide a customer relationship management system and the operation method thereof which can improve the customer's satisfaction by enabling a customer to directly select a technician for providing a service if the customer requests the corresponding service.

In still another aspect of the present invention, there is provided a customer relationship management system comprising a database for storing at least one of introduction information on respective technicians and information on a serviceable time, and information on service request particulars; and a server network constructed to receive a service request from a customer, recommend the respective technicians for the received service to the corresponding customer, and update the service particulars requested by the customer in a schedule of a specified technician if the specified technician is selected by the customer.

At this time, the server network comprises an information collection server for collecting information on the particulars of the requested service and information on a present service progress state of the respective technician, a service progress confirming server for continuously updating the database by continuously confirming the current work progress of the respective technician, an information transfer server for selectively transferring the information stored in the database to a terminal of the respective service provider, and an information extraction server for extracting information on a specified technician suitable for the customer's service request particulars among information on the respective technician stored in the database based on the customer's service request particulars and providing the extracted information to the customer.

In still another aspect of the present invention, there is provided a method of operating the customer relationship management system comprising a first operation step of a server network confirming an area where a customer is located and service providing time if a customer s access for a corresponding service request is confirmed; a second operation step of the server network obtaining schedule information of technicians in charge of a field of the service requested by the customer among the technicians which designate the corresponding area as their service providing area; a third step of the server network extracting information on the technicians which have time to spare when the customer desires to receive the service based on the obtained information; a fourth step of the server network displaying information on the respective extracted technicians on a terminal of the corresponding customer, and requesting the customer to select a specified technician from which the customer desires to receive the service among the displayed technicians; and a fifth step of the server network informing particulars of the service requested by the corresponding customer to the selected technician.

It is still another object of the present invention to provide a customer relationship management system and the operation method thereof which can improve the customer's effective satisfaction with an accurate seizing of the satisfaction with the corresponding service by confirming the customer's satisfaction with the service after performing the service.

In still another aspect of the present invention, there is provided a customer relationship management system comprising a database for storing information on various kinds of service particulars provided to respective customers; a server network for continuously confirming whether performing of a service is completed by confirming the stored information, and confirming a customer's satisfaction with the service if the performing of the corresponding service is completed; and a message transfer server for transmitting a message to a terminal of the corresponding customer for confirmation of the customer's satisfaction with the service if the providing of the service is completed.

In still another aspect of the present invention, there is provided a method of operating the customer relationship management system comprising the steps of a server network confirming whether performance of a service requested by a customer is completed; if it is confirmed that the performance of the service is completed, searching information on the corresponding customer pre-stored in a database, and transferring a message for confirming satisfaction with the provided service to the customer; and if a response to the message transferred to the customer is obtained, registering contents of the message in the corresponding database.

BRIEF DESCRIPTION OF THE DRAWINGS

The above objects, and other features and advantages of the present invention will become more apparent after a reading of the following detailed description when taken in conjunction with the drawings, in which:

FIG. 5a is a table of classification of customers having a positive sensitivity according to the customer relationship management system of the present invention;

FIG. 5b is a table of classification of customers having an expected sensitivity according to the customer relationship management system of the present invention;

FIG. 5c is a table of classification of customers having a negative sensitivity according to the customer relationship management system of the present invention;

FIG. 6 is a view illustrating an example of a computerized display state presented by encoding the sensitivity classification according to the customer relationship management system of the present invention;

FIGS. 7a and 7b are tables of reception contents of a receptionist according to classification codes of customers during the operation process of the customer relationship management system of the present invention;

FIG. 11 is a table of reception contents of a technician according to classification codes of customers during the operation process of the customer relationship management system of the present invention;

FIG. 12 is a view illustrating an example of an input display state of information inputted by a technician during the operation process of the customer relationship management system of the present invention;

FIG. 16b is a view illustrating an example of a web page constructed to perform the service according to the second embodiment of the present invention;

DETAILED DESCRIPTION OF THE PREFERRED EMBODIMENTS

Hereinafter, a customer relationship management system and operation method thereof according to the present invention will be described in more detail with respect to preferred embodiments illustrated in FIGS. 3 to 24.

Figure 1:
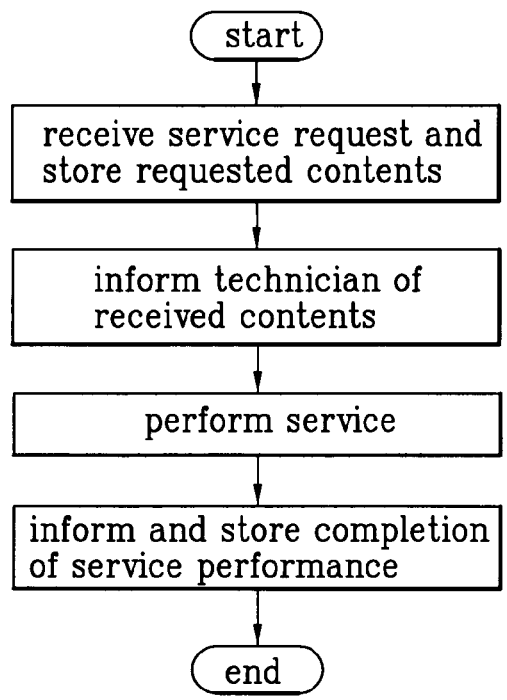
FIG. 1 is a flowchart schematically illustrating a general customer service process.
Figure 2:
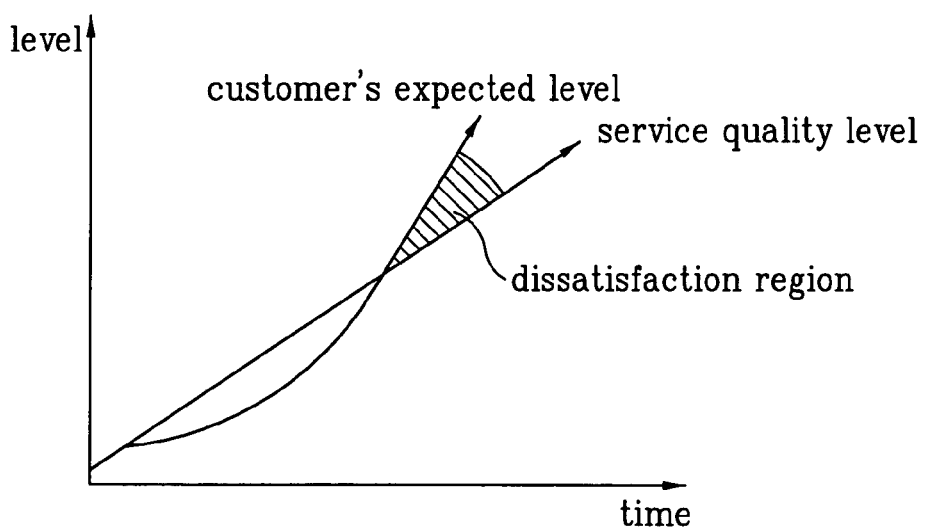
FIG. 2 is a graph showing the service level provided by respective companies in contrast to the service level expected by the customer in relation to time.
Figure 3:
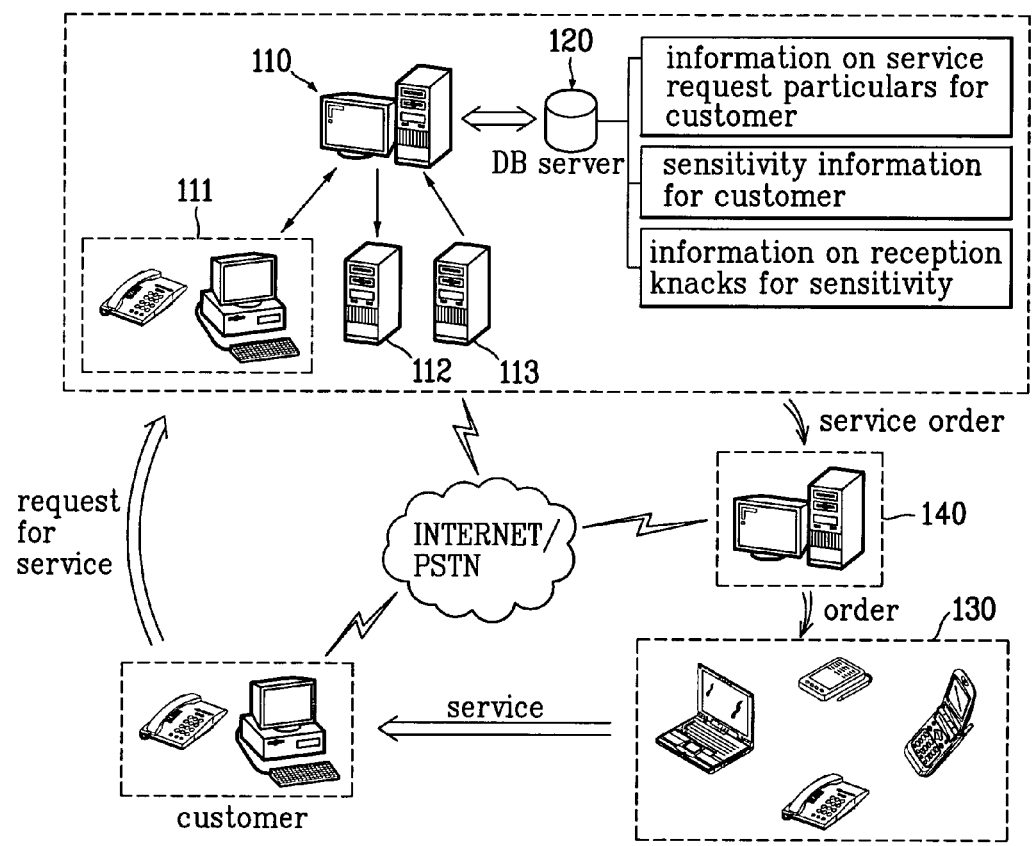
FIG. 3 is a view schematically illustrating the construction of a customer relationship management system according to a first embodiment of the present invention.

First, FIG. 3 is a view schematically illustrating the construction of a customer relationship management system according to a first embodiment of the present invention.

Referring to FIG. 3, the customer relationship management system based on a network according to the first embodiment of the present invention includes a server network 110 for collecting sensitivity information of respective customers and performing the corresponding customer reception, and a database (DB) 120 for storing service request information received from the customers, sensitivity information for the respective customers, and reception information according to the respective sensitivities.

The server network 110 has an information collection server 111 for receiving the customer's service request, and collecting the customer's sensitivity information (i.e., reason and degree of dissatisfaction) seized during the receiving process.

The information collection server 111 may be a terminal manipulated by the receptionist, typical automated response service (ARS) system, or Internet-based network for receiving customer's opinions through various kinds of data communication networks.

However, the ARS system should be provided with a voice recognition unit in order to seize the request particulars and sensitivity of the corresponding customer.

Also, the service request receiving method through the data communication networks should be provided with table of used characters arranged for respective sensitivities so that the sensitivities of the customers can be seized based on the character data inputted by the customers, and additional search means for comparing the character data inputted by the corresponding customers with those of the tables.

According to the present invention, the customer's service request and sensitivity are confirmed by a receptionist who can most accurately seize the customer's sensitivity in a state that the existing system is maintained as it is, and the information collection server 111 comprises a terminal manipulated by the respective receptionist.

The server network 110 further includes an information transfer server 112 for selectively transferring the information stored in the database 120 to terminals of the respective technicians(repair person or service man).

At this time, the information transfer server 112 comprises a server for transferring information using the Internet or various kinds of data communication networks such as mobile communication network, or a server for transferring information using wire/wireless communications.

The server network 110 further includes a service performance confirming server 113 for receiving particulars of the service performance completion from the respective technicians, and register the particulars in the database.

At this time, at least one technician is provided, and the terminal 130 of the technician directly or indirectly receives various kinds of information obtained from the server network 110.

For this, the terminal of the technician may be any one of a portable personal digital assist (PDA), personal computer (PC), or wire/wireless phone.

Meanwhile, the method of receiving the respective information by the technician is not limited to that as described above.

For example, an information repeater network 140 may be constructed in business offices located in respective areas, and linked to the server network 110 of the customer relationship management system according to the present invention, so that the service request information and customer's sensitivity information are transferred to the terminal 130 of the corresponding technician through the constructed information repeater network.

Meanwhile, message receiving spaces may be created on on-line, and then assigned to the respective technicians to effect an indirect transfer of the information. Also, separate private terminals, which can directly connect with the information transfer server, and search or register respective service-related information, may be provided to the respective technicians.

Figure 4:
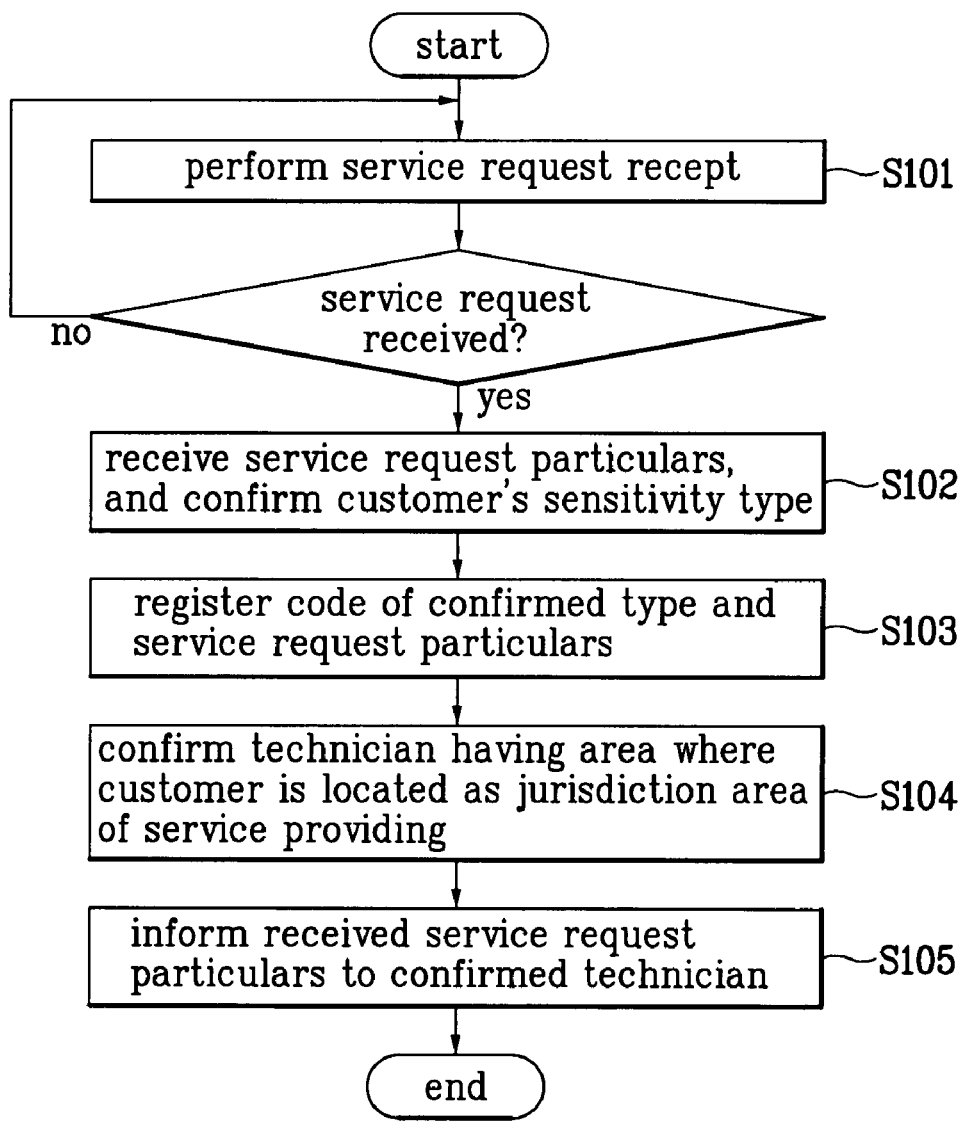
FIG. 4 is a flowchart schematically illustrating an operation process of the customer relationship management system according to the first embodiment of the present invention.

Hereinafter, the operation method of the customer relationship management system according to the first embodiment of the present invention as constructed above will be explained in more detail with reference to FIG. 4.

First, the information collection server 111 that constitutes the server network 110 according to the present invention continuously receives requests for service from the respective customers (step S101).

At this time, the service request is received through general consultation by phone, on-line conversation such as chatting, call using video-communications, e-mail, etc.

If the service request from a specified customer is received, the receptionist of the information collection server 111 receives the particulars of the requested service, and performs the sensitivity classification with respect to the corresponding customer (step S102).

This sensitivity classification is performed in a manner that during the process of receiving the service request from the customer, it is confirmed at which part of the service the customer feels dissatisfaction or satisfaction, and then the sensitivity classification is performed based on the confirmed fact.

At this time, the sensitivity of the customer seized by the receptionist is classified at least into a positive sensitivity, expected sensitivity, and negative sensitivity.

For example, if the customer has a good feeling for the corresponding company to which the receptionist belongs, the customer is classified into a customer having the positive sensitivity, while if the customer does not have so good feeling or ill feeling for the corresponding company, the customer is classified into a customer having the expected sensitivity. If the customer is judged to have an ill feeling for the corresponding company, the customer is classified into a customer having the negative sensitivity.

The classification of the customers should not be performed by the subjectivity of the respective receptionists, but should be performed based on objective data.

According to the present invention, objective particulars for the respective classified types of the customer's sensitivity are additionally proposed in order to seize the customer's classification.

If a customer has at least one particular among request for visit at a convenient time, kind reception, praising the technician, praising the receptionist, praising the corresponding company (or enterprise), praising products of the corresponding company, etc., the customer falls under the classified type having the positive sensitivity.

If a customer has at least one particular among requesting a prompt visit, requesting an excellent technician, having a sense of authority, intimating, taking pride in the enthusiastic fan of the company, having a relative employed in the corresponding company, belonging to a group of livelihood-protection/respect-for-age, taking pride in old products, requesting inexpensive charges, asking questions about guaranteed period, having an insufficient understanding, requesting an accurate visit time, supervising through a third party, withdrawing the service during the technician's visit, etc., the customer falls under the classified type having the expected sensitivity.

Meanwhile, if a customer has at least one particular among receiving no visit at the requested time, having product troubles again, distrusting the technical ability, being dissatisfied with the traveling/repairing charges, being dissatisfied with the collection of the phone call charge and frequent call-disconnection (1588 problems), having difficulty in calling, being impatient in character, considering the promise/confidence seriously, having a hard-grained character, requesting another technician, distrusting the products, being dissatisfied with components of the product, having the reception omitted, having excessive repairing experiences, etc., the customer falls under the classified type having the negative sensitivity.

FIGS. 5a, 5b, and 5c show examples of particulars of the customer classification types and codes according to the particulars, respectively.

According to this classification, proper services for the respective situations are provided with respect to the corresponding company by seizing the degree and type of the customer's good feelings, and thus the customer's good feeling and satisfaction are improved at maximum.

The above-described sensitivity types and particulars of the respective types are prepared by table, and displayed on the screen of the terminal 111 of the corresponding receptionist.

The receptionist accurately confirms the classified sensitivity that the corresponding customer has with reference to the particulars of the table displayed on the terminal 111 during the conversation with the corresponding customer, and selects the particular according to the confirmed type to give a code corresponding to the sensitivity of the corresponding customer.

However, the present invention is not limited to this method. That is, by displaying the sensitivity-classified table with the codes of the respective particulars given in advance, the receptionist may confirm the particular of the sensitivity to which the customer belongs through the conversation with the customer, and confirm the code belonging to the particular to input the confirmed code in the terminal.

At this time, the code inputted by the receptionist is not limited to only one. Considering that the corresponding customer may belong to two or more sensitivity types among the positive, expected, and negative sensitivity types, it is preferable that that the codes belonging to different sensitivity types can be simultaneously inputted with respect to the corresponding customer.

The reason why the customer's classified sensitivities are given with the codes is to pursue convenience in input operation and to prevent the information of the corresponding customer from being easily known to any outsider having no right.

If the input of the sensitivity code of the corresponding customer is completed through the above-described process, the server network 110 obtains the reception information corresponding to the code from the database 120, and displays the obtained information on the screen of the terminal 111 of the corresponding receptionist.

Figure 6:
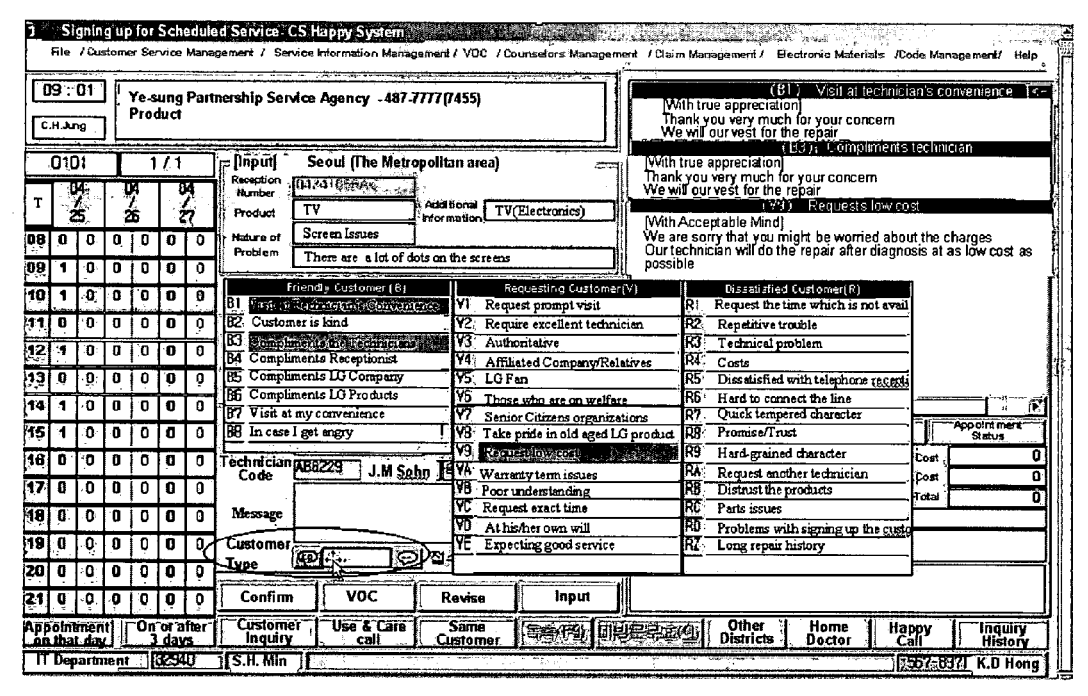

For example, as shown in FIG. 6, if the receptionist confirms the code of the classified sensitivity to which the corresponding customer belongs with reference to a "a" a section of the table showing the particulars of the respective sensitivity types, and inputs the confirmed code on a "b" section for inputting the customer's sensitivity, the server network displays the contents of reception for the confirmed code on a "c" section of the corresponding screen.

The capacity of reception of the receptionist is required at least to reduce the customer's dissatisfaction, and the contents of reception is basically determined to prevent the receptionist's mistake by designating knacks for coping with the respective situations, considering the real condition that the receptionist continuously receive diverse customers.

The coping knacks are not performed simply with one kind of reception contents, but it is preferable that auxiliary reception contents are separately prepared. FIGS. 7a and 7b show such examples.

As described above, the receptionist has a conversation with the corresponding customer, and performs a reception for the service request with reference to the reception contents. Thus, the receptionist gives a primary satisfaction with the service to the customer.

Figure 8:
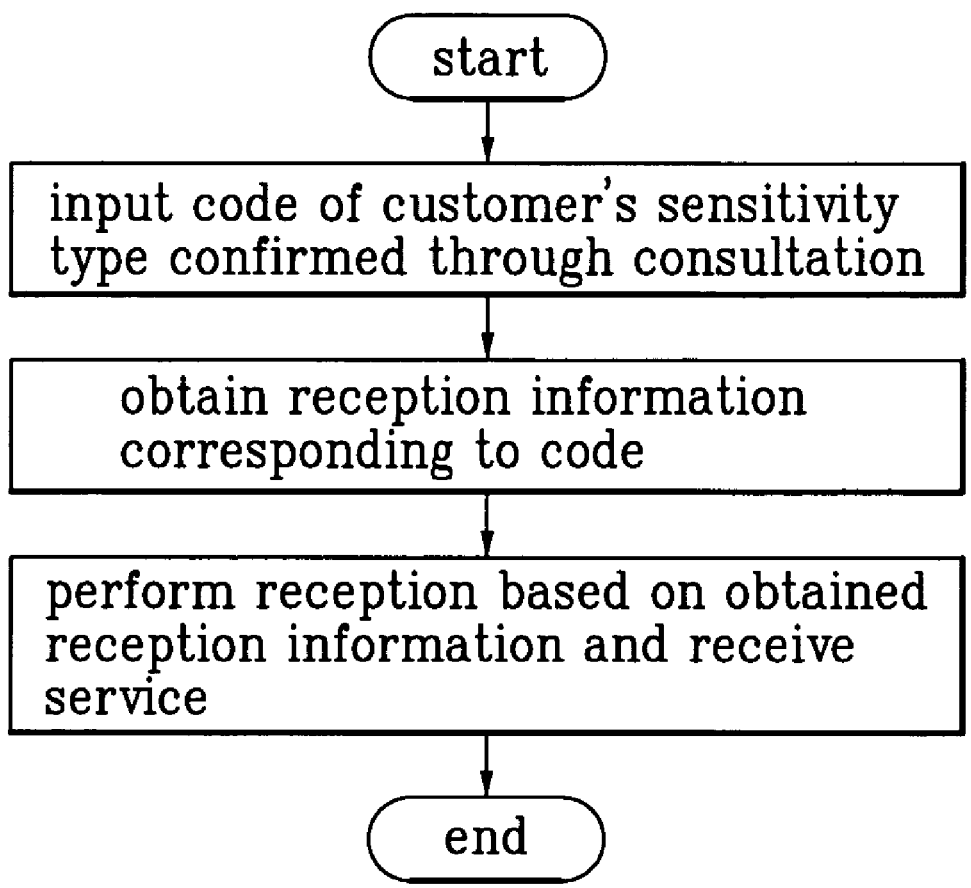
FIG. 8 is a flowchart schematically illustrating a receptionist's reception process according to classification codes of customers during the operation process of the customer relationship management system according to the first embodiment of the present invention.

At this time, the receptionist's reception process according to the sensitivity classification of the corresponding customer is shown in the flowchart of FIG. 8.

Also, the requested service particulars of the corresponding customer received through the above process and the code information on the sensitivity of the customer are registered and stored in the database 120 (step S103).

Figure 9:
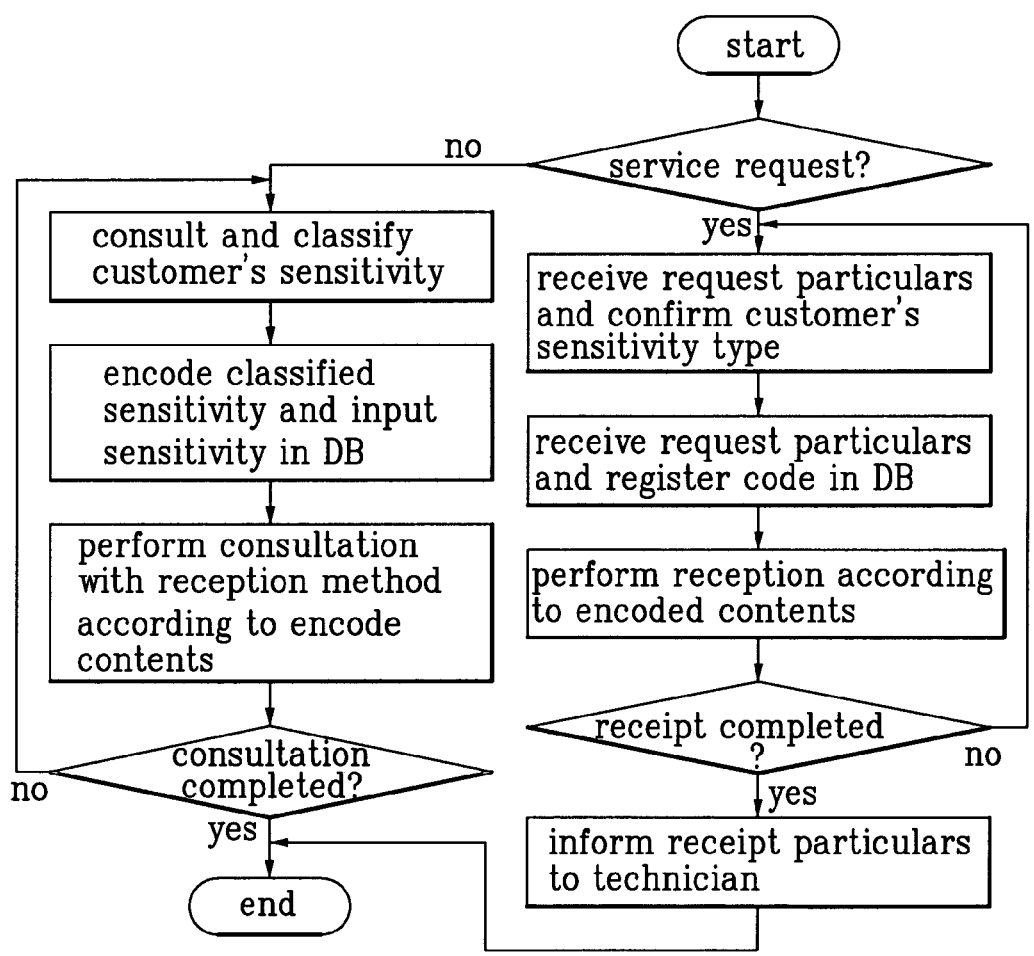
FIG. 9 is a flowchart schematically illustrating a receptionist's performing process according to the contents of a service requested by a customer during the operation process of the customer relationship management system according to the first embodiment of the present invention.

If the customer who connected with the information collection server 111 desires a simple consultation instead of the after-sales service, the receptionist consults with the customer as shown in FIG. 9, confirms and encodes the classified sensitivity information of the customer to input the encoded sensitivity in the database. Also, the receptionist obtains from the database 120 the reception information according to encoded sensitivity information, and consults with the customer based on the obtained reception information.

Then, if the registration of the service particulars requested by the customer and the sensitivity information of the customer is completed through the above-described process, the server network 110 confirms the position of the customer who requested the service based on the registered information, and obtains the information on the technician accommodating the position as its jurisdiction area for providing the service and the terminal 130 of the technician (step S104).

Also, the server network 110 transfers the service request particulars and sensitivity information of the specified customer registered in the database 120 to the terminal 130 of the technician obtained as above (step S105).

At this time, the server network 110 may directly transfer the information registered in the database 120 to the corresponding technician. However, for the efficiency of management, it is preferable that the server network 110 transfers the information to a repeater network 140 of the individual business office located in the corresponding area, and the business office repeats the transferred information to the corresponding technician.

The transfer of the information to the technician is performed using at least one among information transfer through a PDA, information transfer using a mail, direct call through a portable phone, indirect providing of information such as a voice-mail box and short message service (SMS), etc.

The technician, that received the particulars according to the service request and the information according to the sensitivity classification of the customer through the above-described process, performs the corresponding service based on the transferred particulars.

Figure 10:
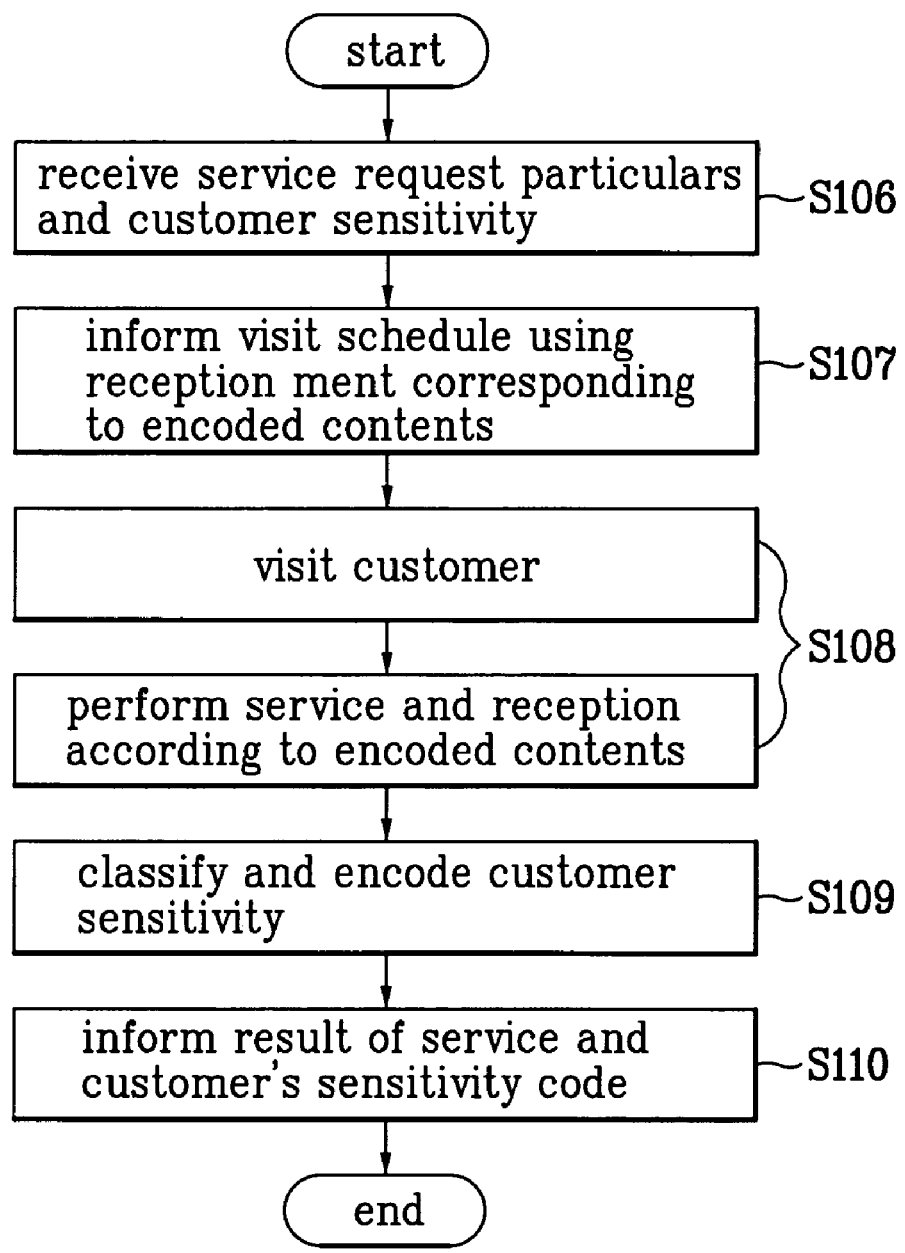
FIG. 10 is a flowchart schematically illustrating a technician's performing process during the operation process of the customer relationship management system according to the first embodiment of the present invention.

FIG. 10 is a flowchart illustrating the service performing process according to the first embodiment of the present invention.

First, the technician informs the corresponding customer of a scheduled visit using a phone before visiting the customer to lead the customer's to prepare for the visit, and confirms whether the corresponding customer is absent (step S106).

At this time, the technician informs the scheduled visit with words and behavior corresponding to the customer's encoded sensitivity type among the information transferred from the information transfer server 112 (step S107).

For example, in case that the customer's encoded sensitivity type is the type R1 in that the customer is dissatisfied with no visit on time, the technician primarily settle the customer's dissatisfaction using the reception behavior and words determined such as I am very sorry I could not visit you at the time you desired and so on along with the general confirmation of the service request particulars.

Then, the technician visits the customer and provides the service based on the transferred information as described above (step S108).

At this time, the technician cares about his/her words and behavior so that the customer is satisfied with reference to the customer's encoded sensitivity information.

Of course, it is natural that the technician solves the service particulars requested by the customer.

The words and behavior of the technician according to the customer's sensitivity information is prepared by informationizing the coping knacks according to the respective situations, and they enable an unskilled technician to coping with the respective situations smoothly.

Specifically, the reception knacks according to the contents of the classified codes are informationized by re-classification, and this information is informed to the respective technician along with the information according to the service request and customer's sensitivity.

FIG. 11 is an example of a table of reception knacks of a technician according to the customer's sensitivity classification performed when the technician visits the customer.

Also, while the above-described service is performed, the technician classifies and encodes the customer's sensitivity by confirming the degree of the dissatisfaction of the corresponding customer (step S109).

If the technician completes the service performance according to the customer's request through the above-described process, the technician informs the result of the service providing to the service performance confirming server 113 of the server network 20 again (step S110).

Figure 12:
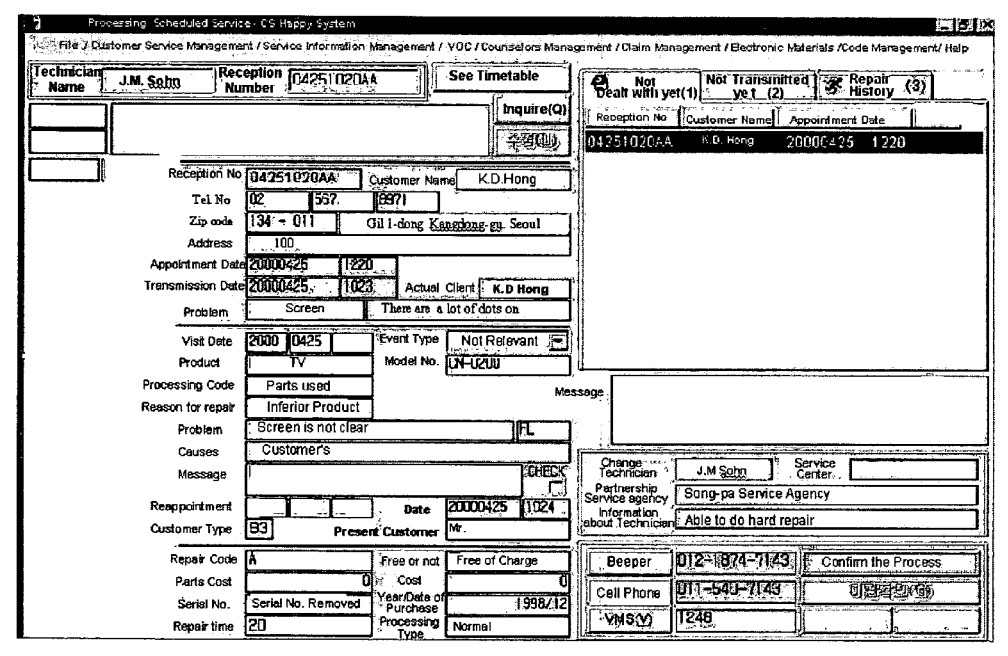

At this time, the result of service performance includes the particulars according to the service providing and code information according to the customer's sensitivity judged again. An example of the construction of the database 120 according to the above service performance result is shown in FIG. 12.

It can be understood that the judgement of the technician who directly meets the customer is more accurate than the judgement of the technician who confirms the customer's sensitivity simply through a phone call.

The information seized as above is used for the preparation of the technician's reception method according to the customer's sensitivity in advance during the confirmation call of the customer's satisfaction at the subsequent process.

Figure 13:
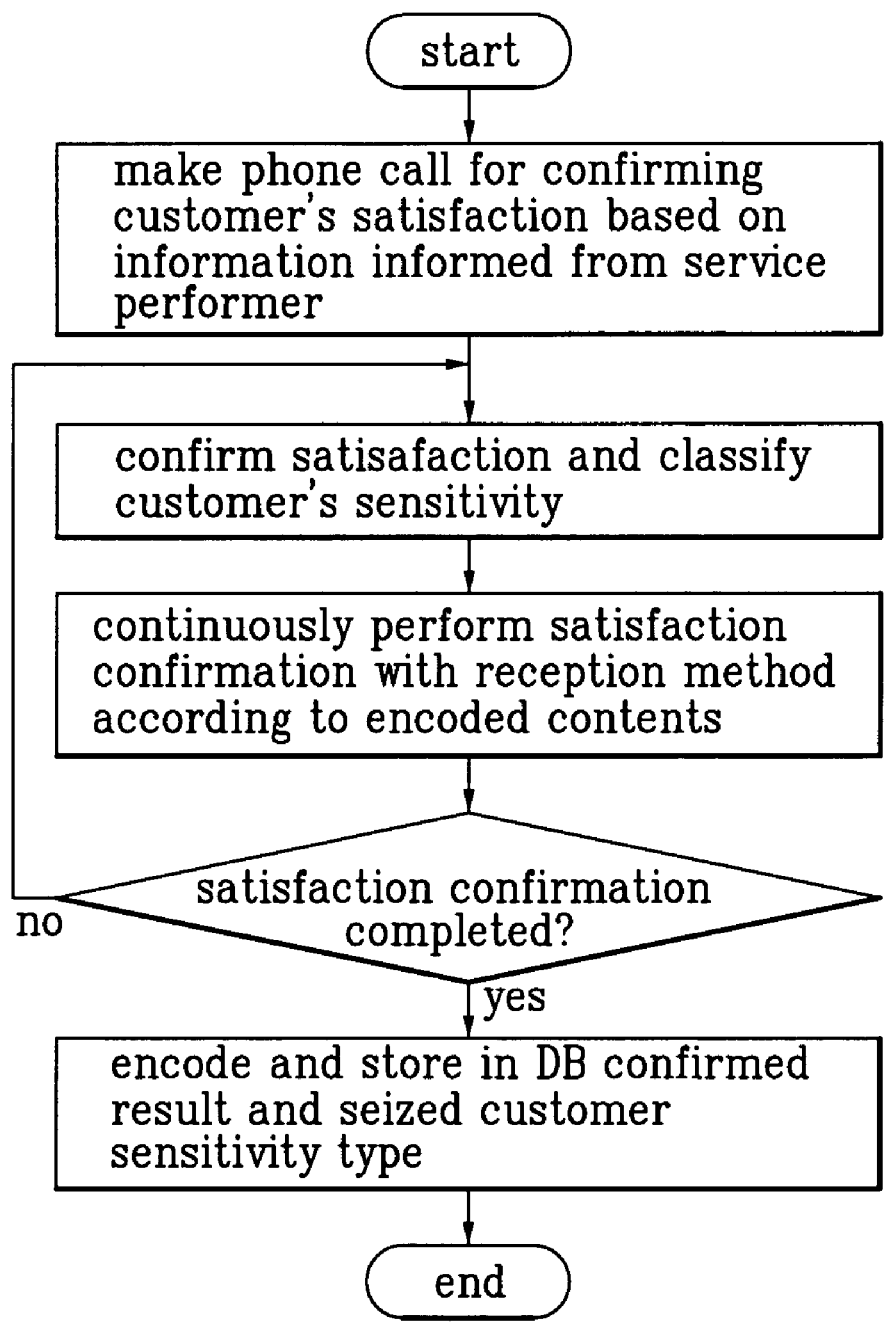
FIG. 13 is a flowchart illustrating the process of confirming whether a customer is satisfied with a completed service during the operation process of the customer relationship management system of the present invention.

Also, the service performance confirming server that is informed of the completion of the service performance through the above process registers the informed particulars in the corresponding database 120 as shown in the flowchart of FIG. 13. Then, the receptionist who confirmed the registered information makes a confirmation call to the customer who received the service to confirm again the knacks to be supplemented for the service and the customer's satisfaction/dissatisfaction according to the service providing.

At this time, the receptionist makes a confirmation call to the corresponding customer using the reception knacks corresponding to the information (i.e., service providing particulars, customer s sensitivity code, etc.) informed by the technician, and seizes the result of the whole service performance by judging again the customer's sensitivity information during the conformation of the service providing.

If the customer is still dissatisfied with the provided service, the receptionist performs again the settlement of the customer's dissatisfaction with reference to the coping knacks according to the determined classification.

Then, the final result of the seized information is stored in the database 120 to complete all the process.

Figure 14:
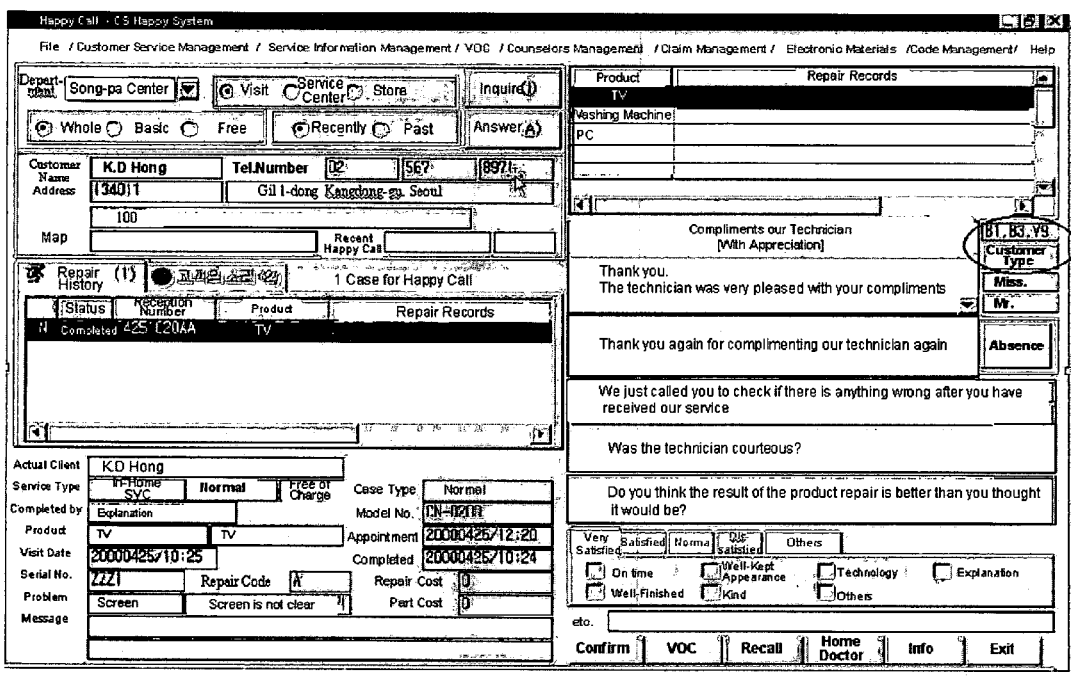
FIG. 14 is a view illustrating an example of a display state for a receptionist's confirming of a customer's satisfaction with the final service and performing of a customer-impressed service.

During the confirmation call, the particulars displayed on the screen of the terminal 111 of the receptionist are as shown in FIG. 14. The receptionist inputs the seized result of the service performance based on the particulars activated on the screen.

At this time, the information stored in the database 120 is referred to during the subsequent service providing to the corresponding customer, and is also used for reference according to the coping knacks for the respective sensitivity codes according to the present invention.

Meanwhile, according to the first embodiment of the present invention as described above, since the customer who requested the service has no information on the corresponding technician at all, the customer may have a feeling of uneasiness due to a strange visitor, and it may cause the customer's dissatisfaction to provide no corresponding service at the time desired by the customer.

In order to solve this problem, the second embodiment of the present invention proposes the customer's direct selection of the technician during the process of receiving the service request.

Figure 15:
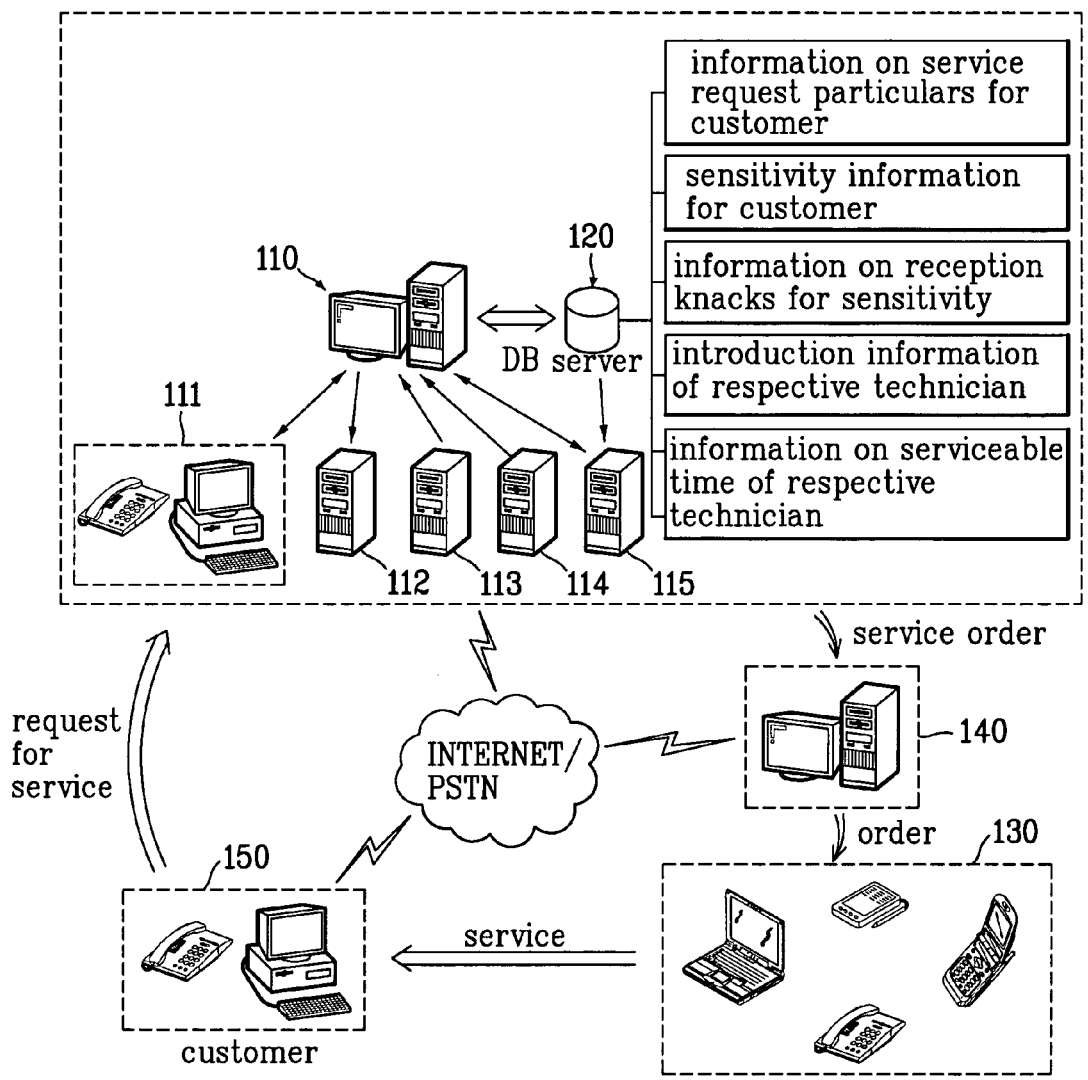
FIG. 15 is a view schematically illustrating the construction of a customer relationship management system according to a second embodiment of the present invention.

The customer relationship management system according to the second embodiment of the present invention includes a service progress confirming server 114, and an information extraction server 115 in addition to the construction of the customer relationship management system according to the first embodiment of the present invention as shown in FIG. 15.

The service-progress confirming server serves to update the database 120 by continuously confirming the current work progress of the respective technician.

The information extraction server 115 serves to extract the information on a specified technician suitable for the customer's service request particulars among the information on the respective technician stored in the database 115 based on the customer's service request particulars.

Meanwhile, the database 120 stores therein introduction information on the respective technicians, and information on serviceable times of the respective technicians in addition to the information on service request particulars.

Hereinafter, the operation method of the customer service system as constructed above according to the second embodiment of the present invention will be explained in detail with reference to FIGS. 16a and 16b.

Figure 16A:
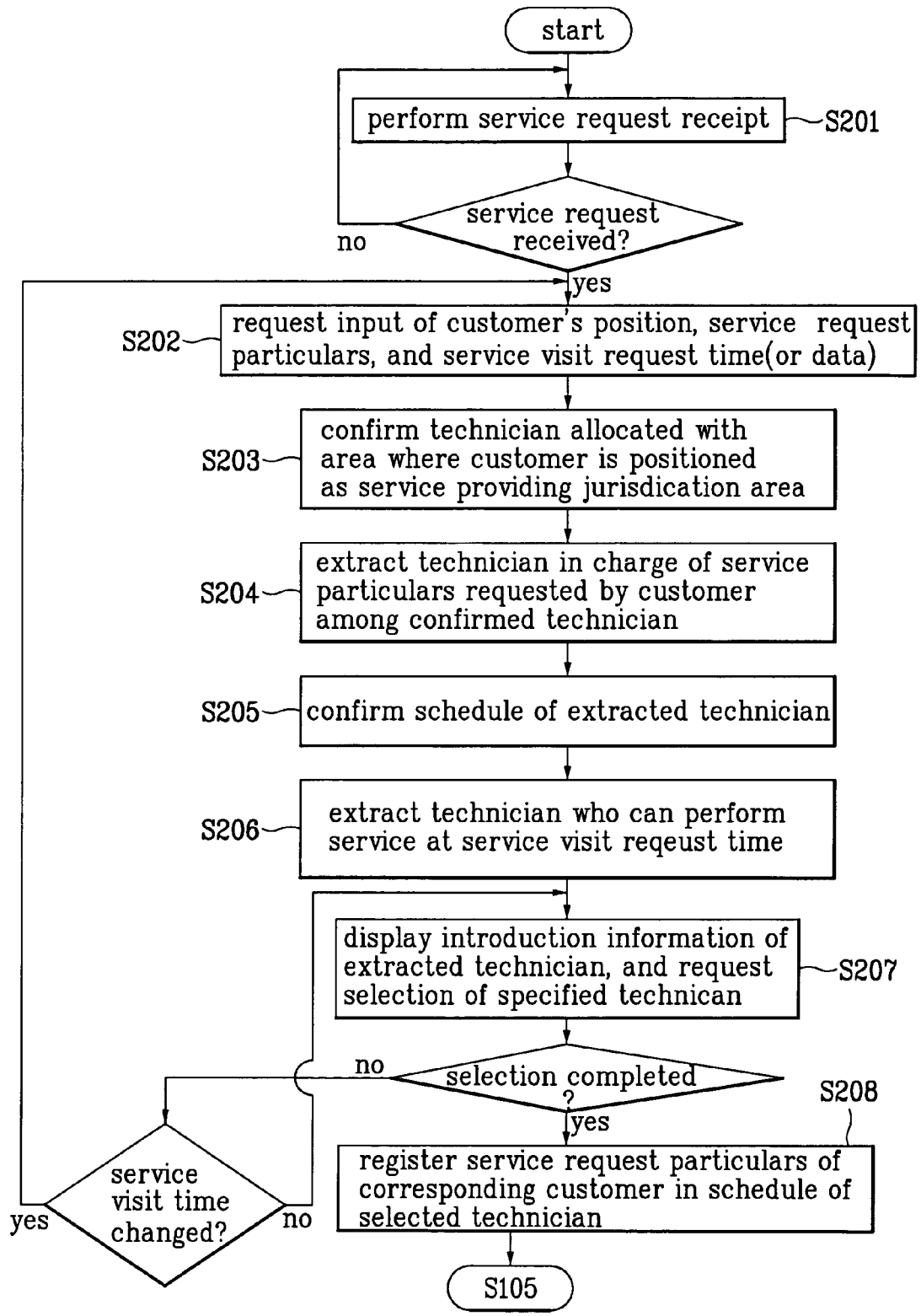
FIG. 16a is a flowchart schematically illustrating an operation process of the customer relationship management system according to the second embodiment of the present invention.

First, as shown in FIG. 16a, the server network continuously receives the service requests from the customers (step S201).

If the service request is received from the specified customer during the above process, the server network confirms at least one information among the information on an area where the corresponding customer is located, service request area, service request time when the customer desires to receive the service, and time when the customer desires to receive the technician's visit (step S202).

At this time, the service request particulars include the kind of the product subject to the service, trouble symptoms, etc., and the respective information is confirmed by the customer's direct input.

FIG. 16b shows an example of a web page for performing the above-described process.

If the confirmation of the information is completed as above, the server network confirms the respective technicians who designate the corresponding area where the customer is located as their jurisdictional service providing area (step S203), extract the technicians in charge of the field of the service requested by the customer (step S204), and obtains schedule information of the extracted technicians (step S205).

At this time, considering that schedule information of the whole technicians in the database are continuously updated through the service progress confirming service, the schedule information of the corresponding technicians can be confirmed by searching the database.

After this process, the information extraction server of the server network extracts the information on the technicians who can perform the service at the date (or time period) that the customer requested by comparing the schedule information of the obtained technician with the customer's service request date (or time period) (step S206).

For example, in case that the customer registered 1 p.m. as the service request time, the information extraction server confirms the schedule of the respective technicians, and extracts the technician who can perform the service at 1 p.m. (i.e., who has no schedule at that time).

Thereafter, the server network 110 obtains the information on the respective extracted technicians from the database 120, and displays the information through the customer's terminal 150 (step S207).

If there is no technician who can perform the service at 1 p.m., the server network informs the customer that there is no technician who can perform the service at the requested time period, extracts and proposes the technicians who can perform the service at a similar time period (for example, 11 a.m.~12 a.m. or 2 p.m.~3 p.m.

At this time, the information on the technician is the information that includes at least one among contents of individual introduction, photograph, phone number, career information, technical field of service, holding state of certificates of qualification, report card on the technician's family.

Accordingly, the customer can feel strong affinities with the corresponding technician by directly selecting the technician, and be free from fear due to a strange visitor since the customer is already familiar with the face of the corresponding technician.

Then, if the customer selects the specified technician among the technicians proposed from the server network 110 through the above-described process, the selected information is registered in the database 120 along with other information on the customer's service request particulars (step S208).

Along with this, the schedule information of the technician selected by the customer is updated with information according to the reservation of the visit time period requested by the customer added thereto, and this updated information is transferred to the terminal 130 of the corresponding technician.

Accordingly, the corresponding technician performs the service based on the information transferred to his/her terminal 130, and registers resultant information of the performed service in the database 120.

The technician's service performing process is the same as that of the first embodiment of the present invention as described above, and the detailed explanation thereof will be omitted.

In order to smoothly provide the service according to the second embodiment of the present invention as described above, various kinds of information on the technician should be accurately updated.

Also, a proper business division should be effected in accordance with the characteristics of the respective areas and the capacities of the respective technicians.

Thus, the present invention additionally proposes an area dividing method and a business dividing method through combination arranging method for each technician.

Figure 17A:
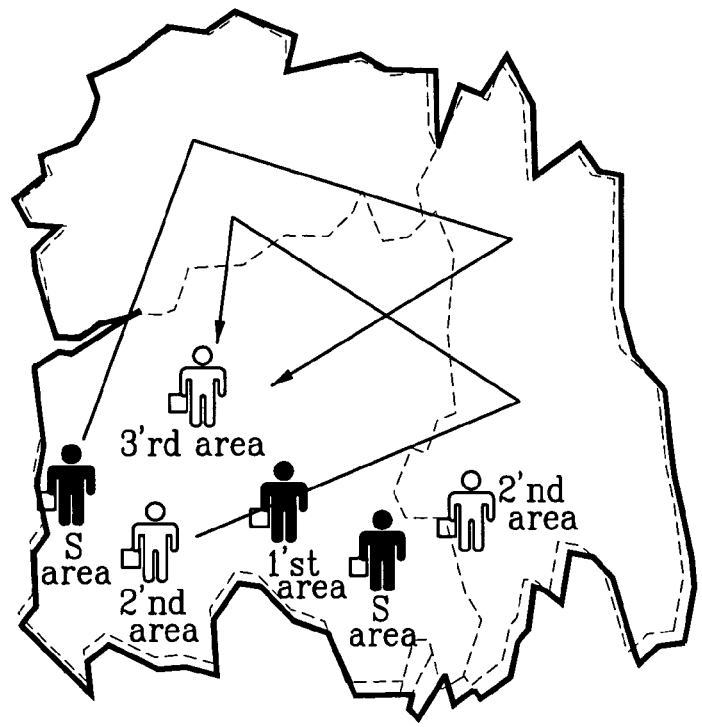
FIGS. 17a and 17b are views schematically illustrating a business division state by an area division and technician mixing arrangement during the operation process of the customer relationship management system according to the second embodiment of the present invention.

First, the area dividing method for the service performance for each technician is for minimizing the time required for the technician's movement. As shown in FIG. 17a, a proper regional arrangement is performed considering the particulars such as residence type (for example, apartment complex area, shopping area, housing complex area, etc.), amount of average daily service receipt, moving time, receipt distribution chart per product, road condition, etc., and the service area is determined not too wide.

Figure 17B:
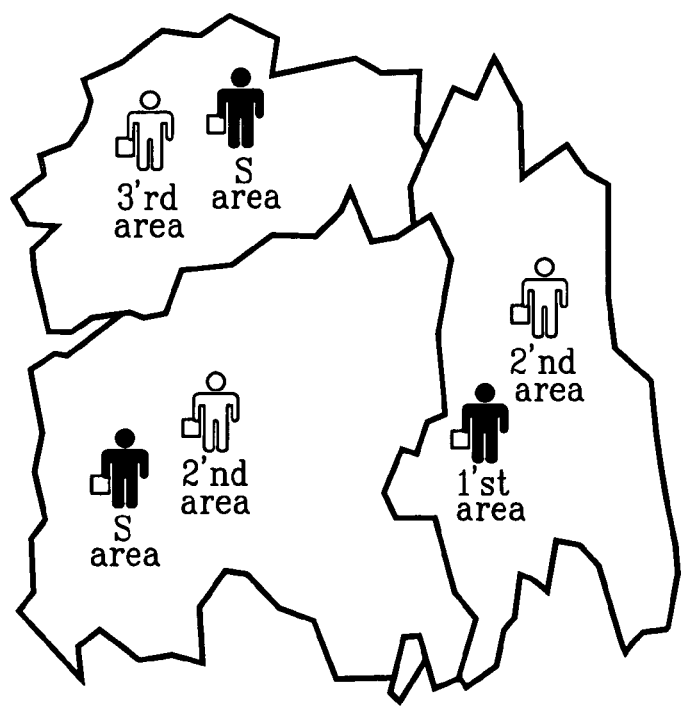

Thereafter, the technicians are arranged considering the characteristics of the divided areas and the capacities of the respective technicians. That is, as shown in FIG. 17b, the technicians are arranged considering the particulars such as a repairing capacity per product, daily service performing capacity, grade and career, results of service performance, additional service providing time period, etc.

At this time, in order to smoothly perform the business division for the respective technicians, the database 120 that reflects the business capacity for each technician should be constructed in advance.

Meanwhile, after the service providing according to the first and second embodiments of the present invention is performed, it is preferable to make an expression of interest for re-confirming the service satisfaction and improving the customer's satisfaction.

The third embodiment of the present invention proposes to more accurately seize the satisfaction with the corresponding service by confirming again the satisfaction with the provided service and to improve the customer's effective satisfaction in addition to the service according to the first and second embodiments of the present invention as described above.

Especially, the third embodiment of the present invention proposes not only to confirm the service satisfaction simply using the phone call but also to confirm the service satisfaction through a message that can be accurately obtained and confirmed by the customer.

Figure 18:
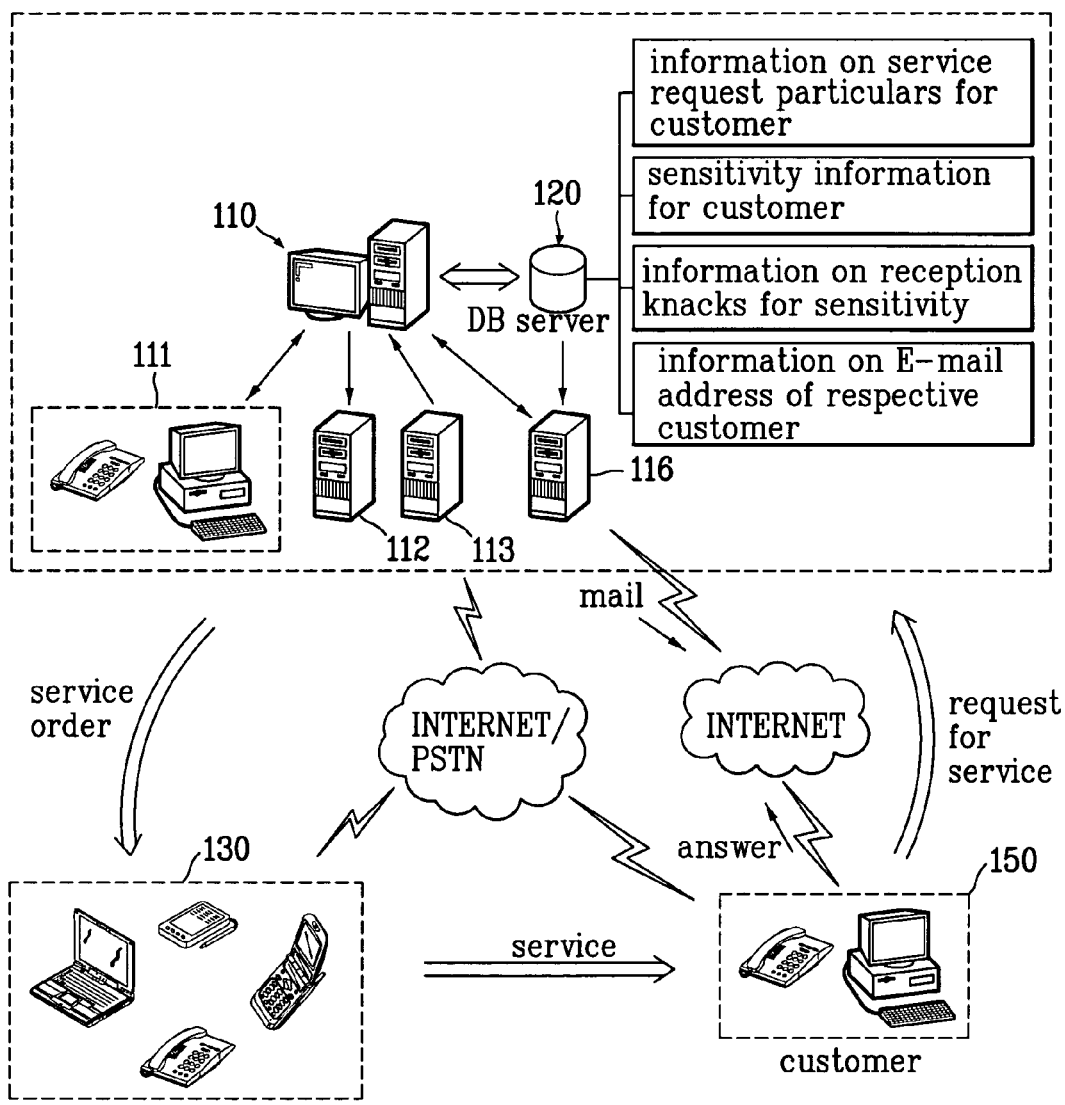
FIG. 18 is a view schematically illustrating the construction of a customer relationship management system according to a third embodiment of the present invention.

According to the third embodiment of the present invention, as shown in FIG. 18, the server network 110 of the first embodiment of the present invention further includes a message transfer server 116 for transferring a message for confirming the service satisfaction to the terminal 150 of the corresponding customer if the service providing to a specified customer is completed.

At this time, the message transfer server 116 may be a mail server for transferring the message prepared by e-mail and so on.

Also, the database 120 further stores address information of the e-mails of the respective customers.

Figure 19:
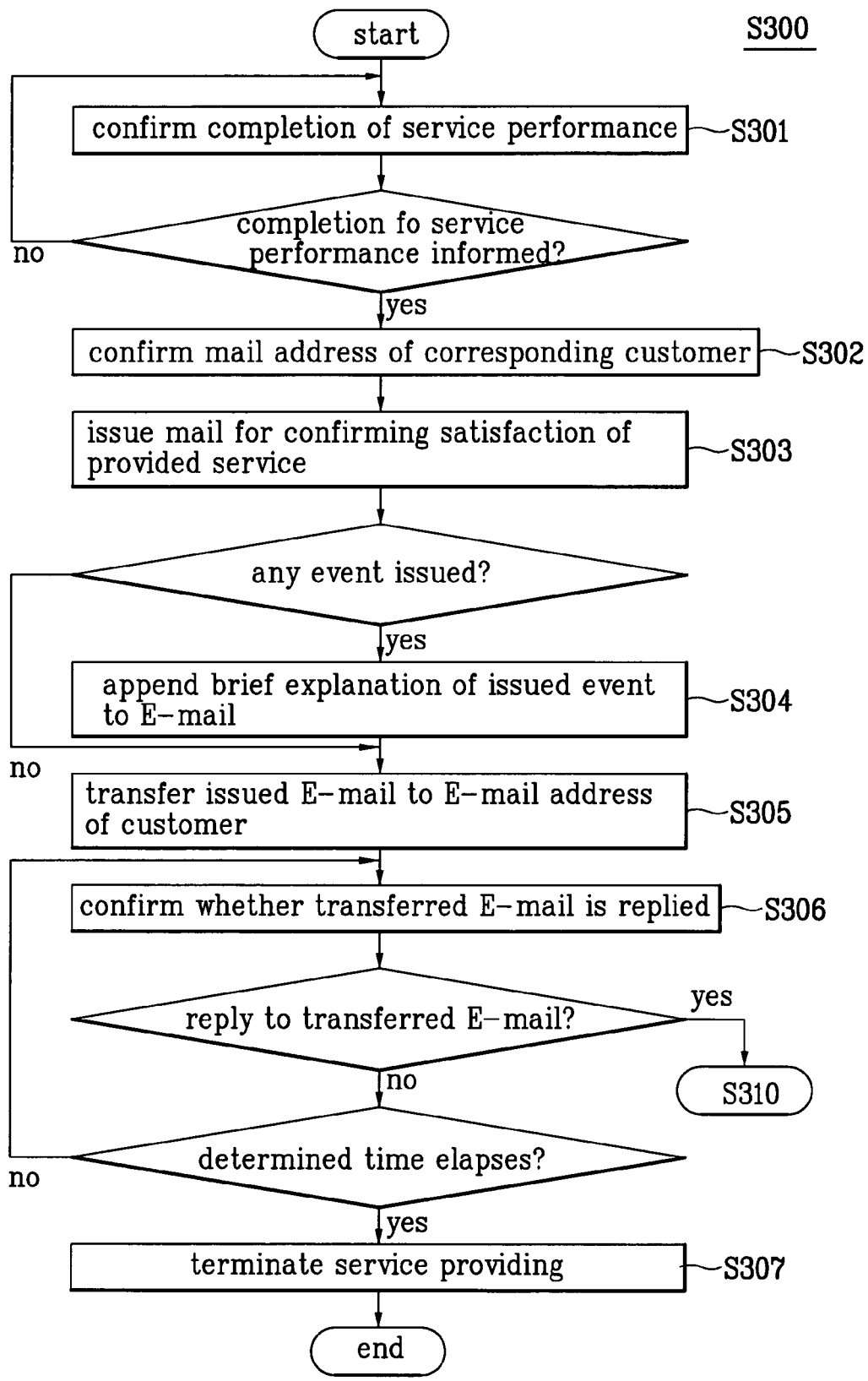
FIG. 19 is a flowchart schematically illustrating an operation process of the customer relationship management system according to the third embodiment of the present invention.

Hereinafter, the operation method of the customer service system as constructed above according to the third embodiment of the present invention will be explained in detail with reference to FIG. 19.

At this time, since the process of receiving the service request from the customer and providing the corresponding service based on the received particulars is the same as that described according to the first and second embodiments, the detailed explanation thereof will be omitted, and the operation process performed when the technician completes the service performance will now be explained.

First, the service performance confirming server 113 continuously confirms whether to complete the service performance (step S301).

During this process, if the service completion is informed from the technician, the service performance confirming server 113 registers the informed contents in the database.

Then, the server network 110 confirms the registered contents, and searches the information on the corresponding customer stored in the database 120 (step S302).

At this time, the information on the customer may be the address of the e-mail, which was entered by the customer when the customer requests the service or registers as a member of the web site that provides the service according to the present invention.

If the customer is the registered customer, the server network 110 additionally requests the customer to input the address of the e-mail to secure the address.

At this time, the message transfer server 116 for transferring the e-mail may be a mail server constructed by a mail service provider for providing a separate electronic mail service, but it is preferable that it is included in the server network 110 of the customer relationship management system according to the present invention for the efficient system management.

Thereafter, the server network 110 issues an e-mail for the satisfaction confirmation with respect to the service based on the customer information searched through the above process (step S303).

The e-mail includes at least one particular among various kinds of questions, repeated troubles, technician's kindness, particulars to be requested to the customer, response to the particulars requested by the customer, and guidance of events.

At this time, in order to transfer the event occurrence, the message transfer server 116 of the server network 110 continuously confirms the occurrence of various kinds of events held by the corresponding company, and if the event occurs, the message transfer server 116 appends a brief explanation of the event to the corresponding mail (step S304).

Then, the mail is transferred to the e-mail address of the confirmed customer through the message transfer server 116 (step S305).

As described above, since the mail for informing the service satisfaction is not of a simple report type, but is of an inquiry type, it leads to the customer's curiosity, and achieves the improvement of the reply rate. Also, the service providing to other customers can be more satisfactorily performed with reference to the customer's opinion obtained from the mail.

However, simply providing the e-mail for the satisfaction confirmation in the form of an inquiry may cause the refusal of the corresponding customer.

Accordingly, it is preferable to provide a predetermined incentive to the corresponding customer if the customer replied to the inquiry included in the e-mail.

At this time, the incentive is given to the customer with knacks obtained when the customer purchases a product of the corresponding company to contemplate the continuous attraction of customers, but it is not limited to this type.

Thereafter, the server network transfers the mail as prepared above to the respective customer through the message transfer server 116, and then continuously confirms the customer's reply (step S306).

If the customer does not reply to the corresponding e-mail for a predetermined time period, the calling or mail transmission is performed again, or the service providing to the corresponding customer is terminated (step S307).

At this time, the server network judges that the customer has no intention to reply to the mail if no reply is received from the customer until the determined time period.

Accordingly, the customer receives the mail for confirming the service satisfaction that is transferred to the customer's mail address at the customer's desired time (i.e., in case that the customer confirms received mails).

This process can solve the problems of the conventional confirming method of service satisfaction in that the call attempt is one-sidedly performed without considering the customer's situation.

Meanwhile, the customer's reply to the e-mail is required to be performed in a convenient manner.

Accordingly, the present invention proposes the use of an e-mail, phone call, short message service (SMS), etc., in receiving the customer's reply.

For example, in case that the customer gives permission to reply to the inquiries written in the mail, the customer can reply through one way among the e-mail, phone call, and SMS after inserting his/her opinion regarding the inquiries.

Figure 20:
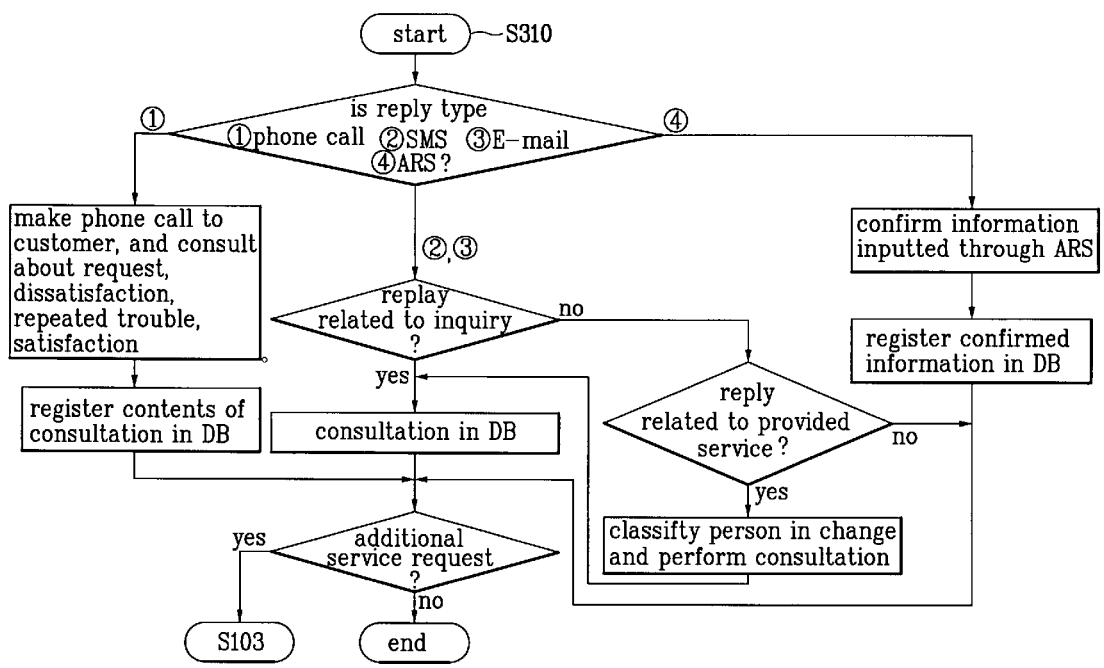
FIG. 20 is a flowchart schematically illustrating respective operation processes according to a method of receiving a message from the customer during the operation process of the customer relationship management system according to the third embodiment of the present invention.

At this time, the server network 110 performs its operation according to the selected type of reply as shown in FIG. 20.

First, in case that the reply to the transferred mail is performed through an e-mail or SMS, the server network 110 classifies the contents of the transferred e-mail by terms, and registers the classified contents in the corresponding database 120.

At this time, the classified terms may be reception, dissatisfaction, and satisfaction, but not limited to this.

Specifically, considering that the dissatisfied customers mostly do not reply to the mail, the term of dissatisfaction may be omitted, and the term of satisfaction maybe further classified into simple satisfaction and high satisfaction. Also, the customer's reply may be just for asking how to user or informing the repeated trouble.

Accordingly, the present invention proposes that the terms according to the contents of the replied mail are classified into a reception of the inquiry, contents of the provided service, etc.

At this time, the contents of the provided service may be dissatisfaction with the provided service, simple satisfaction, inquiry about how to use and repeated trouble, impression, etc.

If the contents of the replied mail are related to the service provided by the technician, the server network 110 discriminates the corresponding person in charge, and controls the person in charge to perform the consultation.

The information classified as above and stored in the database 120 is used as a guidepost for improving the subsequent service.

Specifically, the dissatisfaction terms among the stored information are used as reference data for its improvement, while the satisfaction terms are used as reference data for the providing of better service.

If the contents of the replied mail are related to the additional request for service or repeated trouble, the requested service is re-performed, and the above-described processes are repeated.

Second, in case that the reply to the transferred mail is performed through a phone call, the server network 110 connects the customer to the person in charge of the customer service center having the area where the customer resides as its jurisdictional area or to the receptionist, and confirms additional service request, demand for dissolution of various kinds of dissatisfaction terms, opinion about the satisfaction, inquiries in use, repeated trouble, etc., through the phone call with the corresponding customer.

The contents of consultation through the phone call are stored in the corresponding database 120.

At this time, if the contents of the replied mail are related to the additional request for service or repeated trouble, the requested service is re-performed, and the above-described processes are repeated.

Third, in case that the reply to the transferred mail is performed through an auto response system (ARS) service, the server network 110 confirms the contents inputted through the ARS service, and stores the confirmed contents in the corresponding database 120.

At this time, the contents confirmed through the ARS service includes the satisfaction or dissatisfaction with the service provided by the technician, repeated trouble, additional service request, various kinds of inquiries, etc.

If the customer requests an additional service or asks various kinds of questions, the server network 110 leads the customer to call the receptionist, and thus more satisfactory service is provided to the customer.

Meanwhile, the transferring of the message for confirming the customer's satisfaction with the service provided to the customer is not performed only through the e-mail.

That is, considering that most customers have a mobile communication terminal, the message for confirming the satisfaction may be transferred through the SMS using the mobile communication network.

Figure 21:
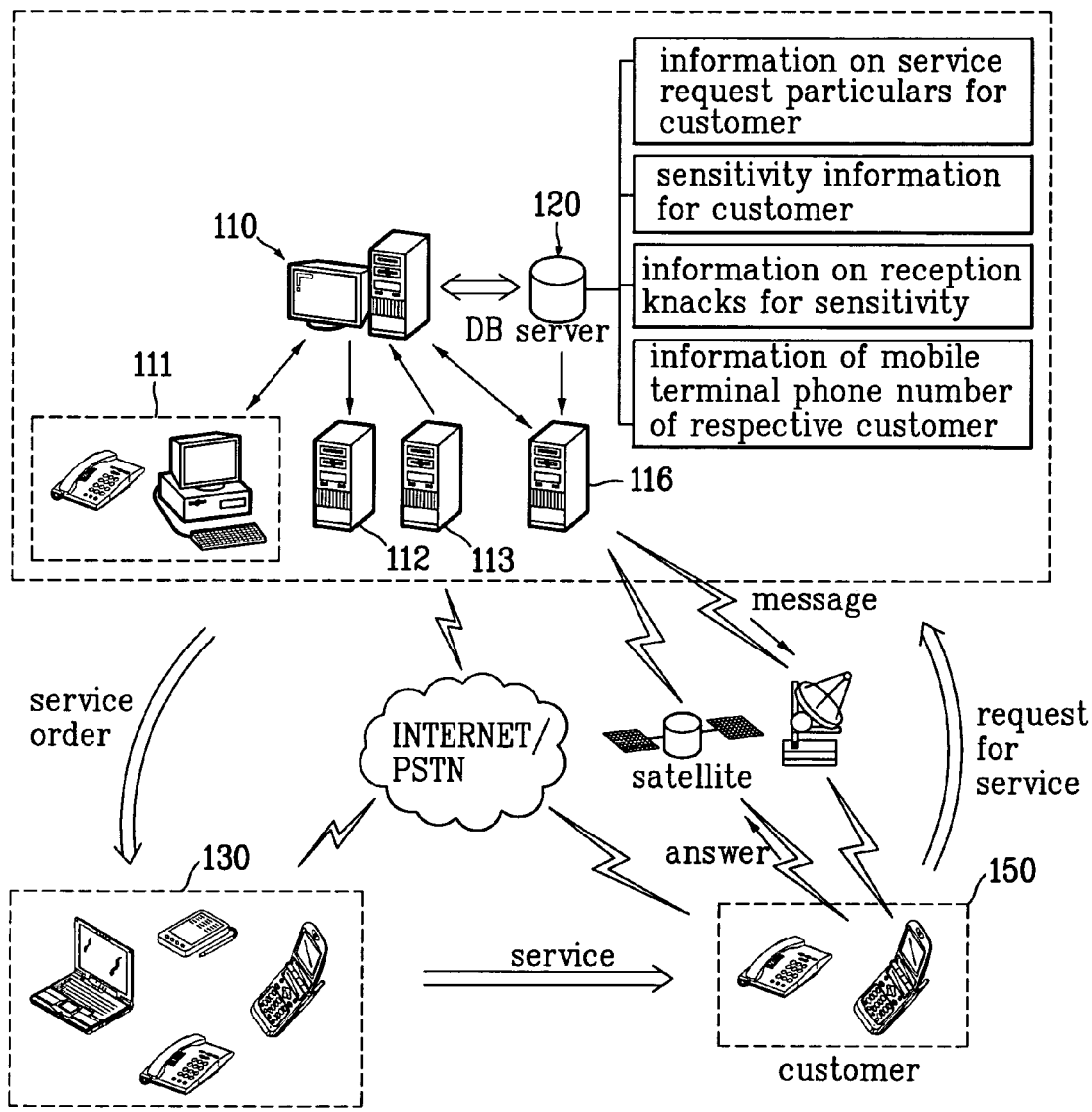
FIG. 21 is a view schematically illustrating the construction of a customer relationship management system according to a fourth embodiment of the present invention.

The customer service system according to the fourth embodiment of the present invention proposes that the message transfer server comprises a server 117 for performing the message service used in a wireless communication network or mobile communication network as shown in FIG. 21.

At this time, it is preferable that the message service server 117 is not constructed on the network of the service provider according to the present invention, but the message service server constructed on the network operated by message transfer service agents or wire/mobile communication service providers may be used.

Figure 22:
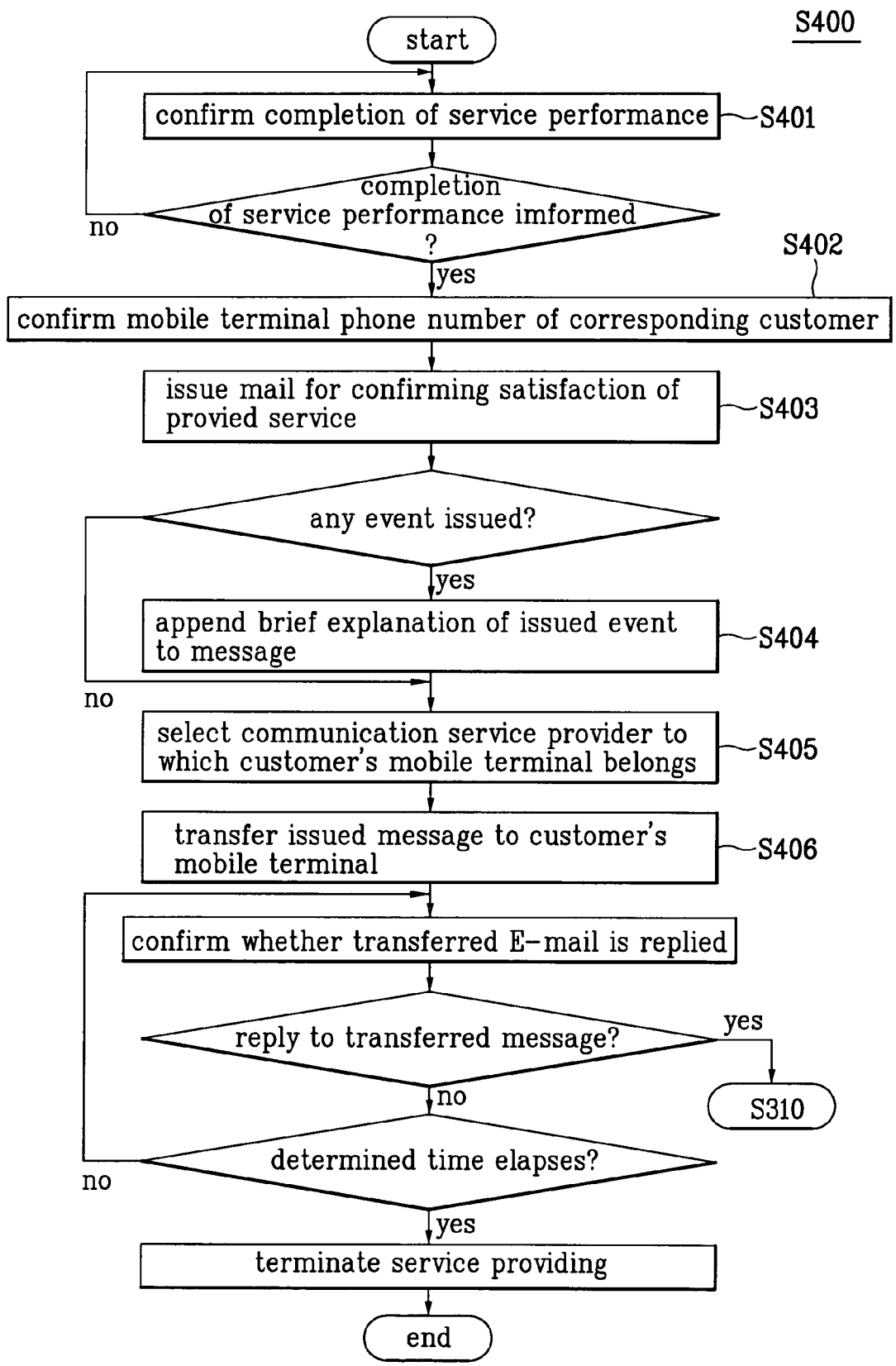
FIG. 22 is a flowchart schematically illustrating an operation process of the customer relationship management system according to the fourth embodiment of the present invention.

Hereinafter, the operation method of the server network after the report of the service completion is received from the technician as constructed above according to the fourth embodiment of the present invention will be explained in detail with reference to FIG. 22.

First, the service performance confirming server 113 continuously confirms whether to complete the service performance (step S401).

During this process, if the service completion is reported from the technician, the service performance confirming server 113 registers the informed contents in the database 120.

Then, the server network 110 confirms the registered contents, and searches the information on the corresponding customer stored in the database 120 (step S402).

At this time, the information on the customer may be the mobile phone number of the corresponding customer.

If the mobile phone number of the customer is confirmed, the message service server 117 of the server network 110 issues a message for the customer's satisfaction (step S403).

At this time, the issued message includes at least one particular among the satisfaction with the service, questions in use, questions about repeated troubles, etc.

Also, if the corresponding service provider (operating the customer service center) issues an event during the above process, the server network appends a brief explanation of the event to the message.

Thereafter, the message service server 117 selects one among the respective mobile communication service providers, and determines a communication network for message transmission (step S404).

At this time, it is preferable to select the mobile communication service provider to which the customer belongs, but other providers may also be selected.

Also, the company for transferring the message may be any company operated by the message transfer service agent for performing the SMS instead of the company operated by the mobile communication service provider.

Then, if the selection of the company for transferring the message is completed during the above process, the message service server 117 enters the originator that sends the message and phone number to which the message is replied.

At this time, it is preferable that the sender of the message is the customer service center having the area where the corresponding customer resides as its jurisdictional area, and the phone number is that of the person in charge of the customer service center for confirming the customer's satisfaction.

Accordingly, if the customer returns the call or recalls the person in charge of the corresponding customer service center to ask questions or as needed, he/she can directly deal with this.

If the message is prepared after the completion of the above process, then the prepared message is sent to the respective customers through the SMS server 117 of the corresponding mobile communication network.

Thereafter, if the customer confirms the message and selects to reply or make a phone call, the server network 110 confirms and registers in the database 120 the customer's satisfaction with the service through the operation process according to the third embodiment of the present invention.

Figure 23:
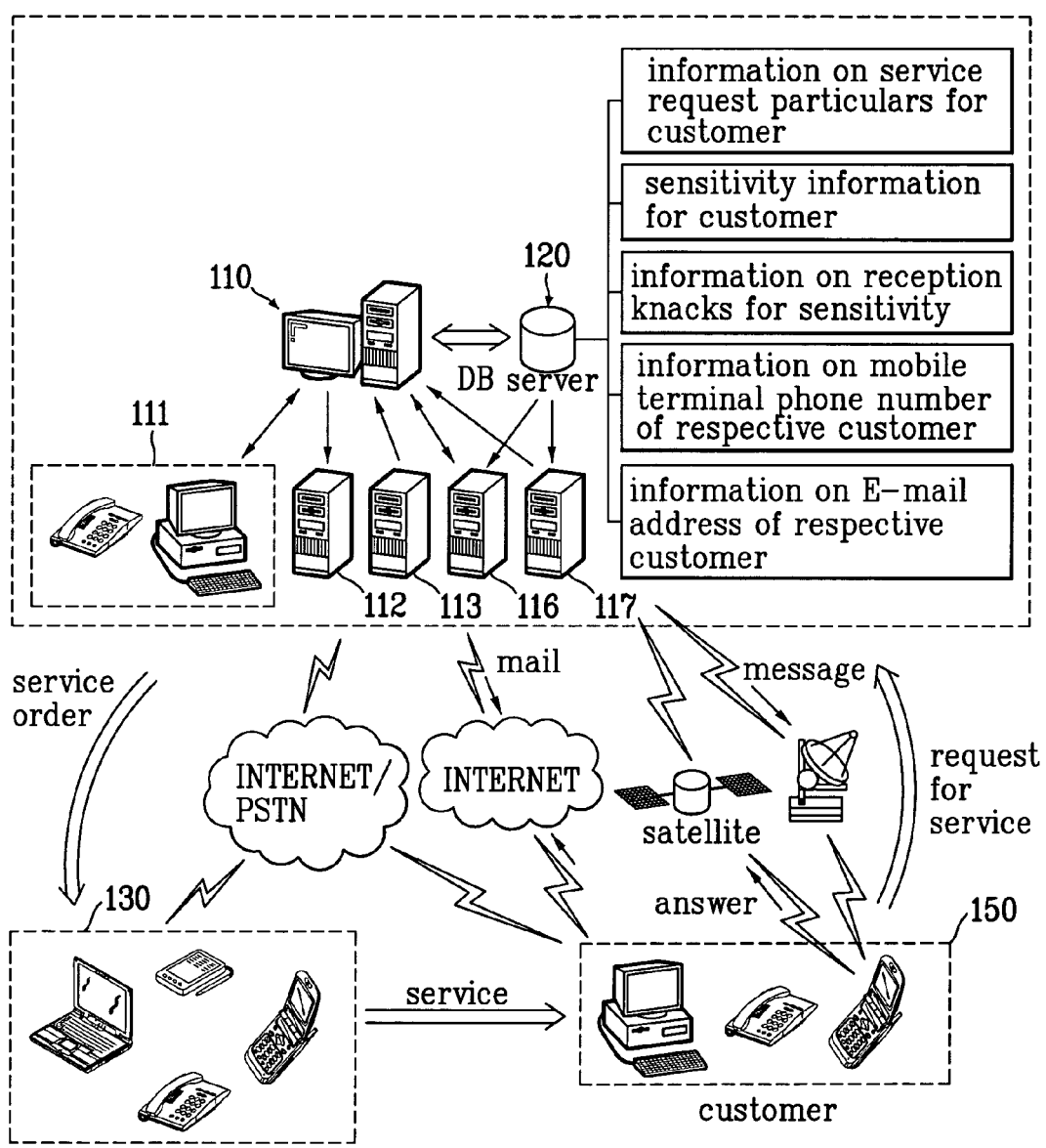
FIG. 23 is a view schematically illustrating the construction of a customer relationship management system according to a fifth embodiment of the present invention.

Meanwhile, FIG. 23 illustrates the construction of the fifth embodiment of the present invention.

The fifth embodiment of the present invention proposes to include both a mail server 116 for making the message transfer server according to the third and fourth embodiments of the present invention as described above transmit the message prepared as an e-mail and so on to a personal computer (PC) of the customer, and a message service server 117 for transmitting the message to the customer's mobile communication terminal using the mobile or wireless communication network.

At this time, the message transfer server may be constructed in association with a separate service provider for providing the message service, or in combination with the server network according to the present invention.

The fifth embodiment of the present invention is constructed to operate in combination with the third and fourth embodiments of the present invention as described above, and thus it can maximize the hit rate of the message transmission with the improvement of the customer's return rate.

Figure 24:
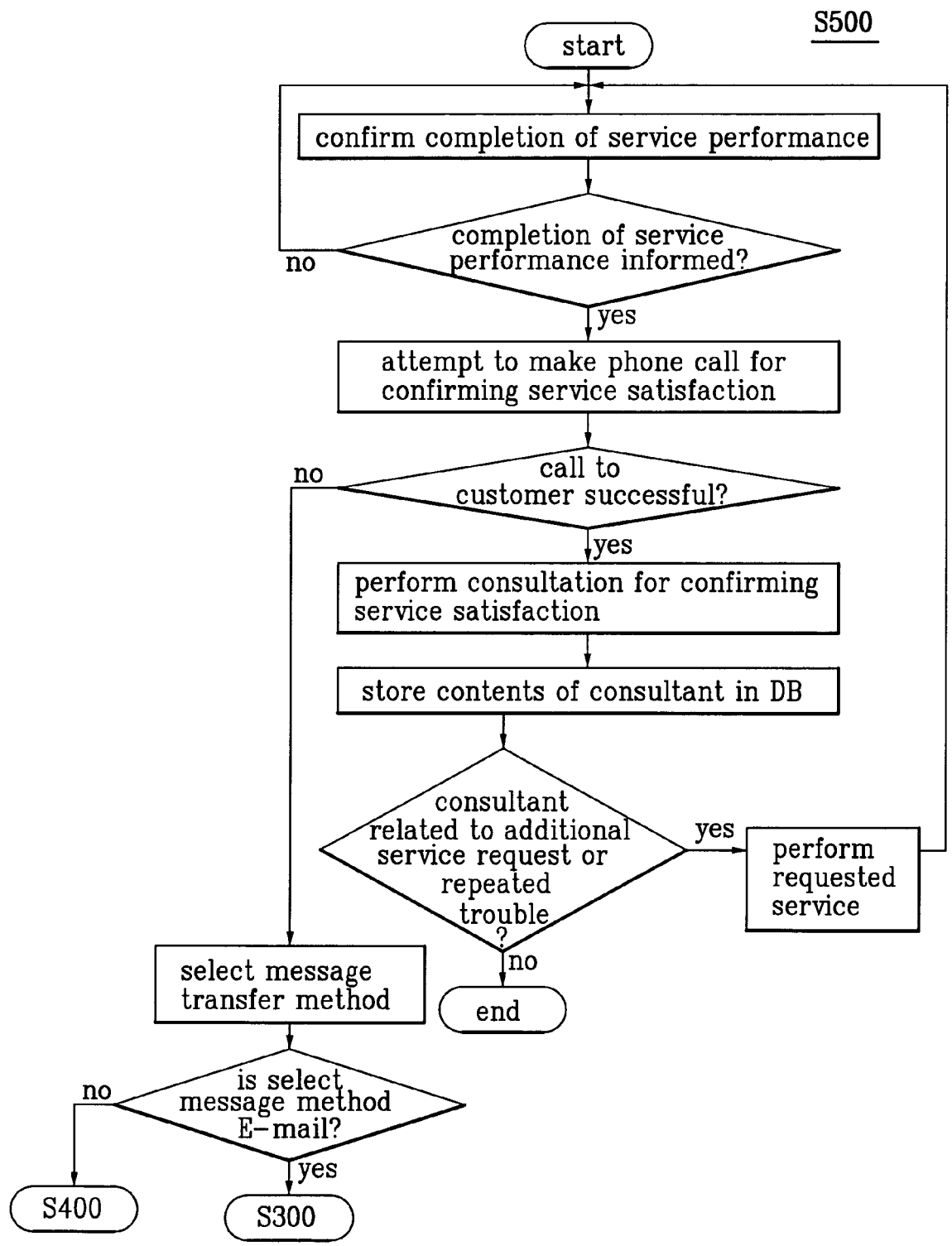
FIG. 24 is a flowchart schematically illustrating an operation process of the customer relationship management system according to the fifth embodiment of the present invention.

Hereinafter, the operation method (S500) of the customer service system as constructed above according to the fifth embodiment of the present invention will be explained in detail with reference to FIG. 24.

First, if the corresponding person in charge for confirming the service satisfaction searches the database 120 and confirms the customer who requested the service that the providing of the corresponding service is completed, the person in charge makes a phone call to the customer, and primarily confirms the satisfaction with the provided service before transmitting the message for confirming the satisfaction according to the service providing to the customer.

If the phone call to the customer is difficult or the customer is absent during the above process, the person in charge sends a message using an e-mail or short message service of the mobile communication.

Specifically, if the customer is on the phone, the person in charge consults with the customer, and stores the contents of consultation and a code according to the customer's sensitivity in the corresponding database 120, while if the customer is not on the phone or absent, the person in charge transfers the message for confirming the service satisfaction through either the e-mail or short message service.

At this time, the message transfer method can be selected by searching the information of the customer stored in the database 120.

Specifically, if only the e-mail address of the customer is entered as the information of the searched customer, the person in charge selects the message transfer method using the customer's e-mail address, while if only the phone number of the mobile terminal 150 of the customer is entered as the information of the customer, he/she selects the message transfer method using the short message service.

If both the e-mail address and the phone number of the mobile terminal are entered as the customer information, the person in charge selects at least one of the message transfer methods.

Then, if the message transfer is completed through the above-described process, the server network 110 confirms the message received from the customer in the same process as the third and fourth embodiments as described above.

If the customer does not reply to the message, the server network 110 terminates the corresponding process. That is, if the customer does not reply to the message until a predetermined time period, the server network judges that the customer has no intention to reply to the message, and terminates the process.

As described above, the customer service system and operation method thereof according to the present invention has the following effects.

First, by presenting a method of coping with the customers of various types to the receptionist when the service request is received from the customer, the service for the customer's satisfaction can be smoothly performed.

Second, since the service is performed by the technician based on the customer's sensitivity information confirmed during the receipt of the customer's service request, the service for the customer's satisfaction can be smoothly performed.

Accordingly, the technician can solve the customer's dissatisfaction particulars at maximum, and thus can lead the improvement of the customer's satisfaction.

Third, the customer directly selects the technician, and thus can remove the uneasy feeling caused by a strange visitor.

Fourth, the service providing can be smoothly performed by the career management of the technician.

Fifth, by repeatedly confirming the customer's satisfaction with the corresponding service after completion of the service, the reliability of service with respect to the customer can be improved.

Sixth, by using an e-mail or message service of the mobile communication terminal that does not restrict the time for the confirmation of the service satisfaction, the customer can conveniently confirm the message when necessary.

Accordingly, the customer's satisfaction can be maximized, and the reply rate to the message can be improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A customer relationship management system comprising:
   a server configured to collect request information concerning a customer request, to collect customer sensitivity information concerning a sensitivity of the customer, and to provide at least one behavioral pattern example to a responding person on how to interact with the customer based on the collected customer sensitivity information,
   a display configured to display customer attitude categories including a positive attitude category, a negative attitude category and an expected attitude category with a plurality of codes for each category such that the responding person need only select a respective code based on the collected customer sensitivity information,
   wherein the display displays for each selected code the at least one behavioral pattern example, which includes specific language to be used by the responding person when responding to the customer.

2. The customer relationship management system as claimed in claim 1, further comprising:
   a database configured to store the request information, the customer sensitivity information, the at least one behavioral pattern, and personnel information about responding persons that may be selected to respond to the customer request;
   a transfer mechanism configured to transfer the customer sensitivity information and the at least one behavioral pattern to at least one selected responding person; and
   a service progress confirming server configured to update a current progress state by continuously confirming a current progress state of the responding person.

3. The customer relationship management system as claimed in claim 2, further comprising:
   an information extraction mechanism configured to extract information on a specified responding person that is best suited to handle the customer's request based on the personnel information about the responding persons and customer's request, and to provide the extracted information on the specified responding person to the customer.

4. The customer relationship management system as claimed in claim 2, further comprising a service performance confirming mechanism configured to receive performance completion information concerning the customer's request from the responding person, and to register the performance completion information in the database.

5. The customer relationship management system as claimed in claim 2, further comprising a message transfer mechanism configured to transfer a message to the customer for confirming the customer's request has been satisfactorily handled by the responding person after the customer's request has been handled.

6. The customer relationship management system as claimed in claim 5, wherein the message transfer mechanism is at least one from a server configured to transfer the message prepared as an e-mail and a server configured to perform a message service used in a mobile communication network.

7. The customer relationship management system as claimed in claim 2, wherein a terminal of the responding person is a portable personal digital assist (PDA), portable personal computer, individual personal computer, or portable wire/radio phone, which can receive information from the transfer mechanism through communication networks including on-line message receiving space assigned to the responding person, or search and register information concerning the customer's request by directly accessing the transfer mechanism.

8. The customer relationship management system as claimed in claim 1, further comprising:
   a database configured to store at least one from introduction information about responding persons that may be selected to respond to a customer's request and information on a serviceable time, and information concerning the customer's request,
   wherein the server receives the customer's request, recommends at least one responding person for the received customer's request, provides the introduction information for the recommended at least one responding person, allows the customer to select a specified responding person from the at least one responding persons, and updates the service particulars requested by the customer in a schedule of a specified responding person if the specified responding person is selected by the customer.

9. The customer relationship management system as claimed in claim 8, further comprising:
- an information collection mechanism configured to collect information concerning the customer's request and information on a present response progress state of the selected responding person;
- a service progress confirming mechanism configured to update the database by confirming a current work progress of the selected responding person;
- an information transfer mechanism configured to selectively transfer the information stored in the database to a terminal of the selected responding person; and
- an information extraction mechanism configured to extract information on a specified responding person suitable for the customer's request among information on the respective responding person stored in the database based on the information concerning the customer's request and to provide the extracted information to the customer.

10. A method of operating a customer relationship management system comprising:
- collecting request information concerning a customer request;
- collecting customer sensitivity information concerning a sensitivity of the customer;
- providing at least one behavioral pattern example to a responding person on how to interact with the customer based on the collected customer sensitivity; and
- classifying the sensitivity of the customer in a manner that if the customer has a good feeling for the response, the customer is classified into a customer having a positive sensitivity, if the customer has an expected feeling, the customer is classified into a customer having an expected sensitivity, and if the customer has an ill feeling, the customer is classified into a customer having a negative sensitivity,
- wherein each classification includes a plurality of codes for each classification such that the responding person need only select a respective code based on the collected customer sensitivity information, and
- wherein the display displays for each selected code the at least one behavioral pattern example, which includes specific language to be used by the responding person when responding to the customer.

11. The method as claimed in claim 10, further comprising:
- storing in a database the request information, the customer sensitivity information, the at least one behavioral pattern, and personnel information about responding persons that may be selected to respond to the customer's request;
- transferring the customer sensitivity information and the at least one behavioral pattern to at least one selected responding person; and
- confirming the collected customer sensitivity information based on a receptionist's conversation with the customer.

12. The method as claimed in claim 11, wherein the collected customer sensitivity information is confirmed by comparing at least one from a high/low-pitched voice and words used during the customer's request with predetermined reference particulars of a sensitivity classification.

13. The method as claimed in claim 10, wherein the customer having the positive sensitivity is a customer having at least one from requesting a visit at a convenient time, holding a kind reception, praising a responding person, praising a receptionist, praising a company or enterprise related to the customer's request, and praising products of the company or enterprise.

14. The method as claimed in claim 10, wherein the customer having the expected sensitivity is a customer having at least one from requesting a prompt visit, requesting a superiorperson to respond to the customer's request, having a sense of authority, intimating, taking pride in an enthusiastic fan of a company related to the customer's request, having a relative employed in the company, belonging to a livelihood-protection/respect-for-age group, taking pride in old products, requesting inexpensive charges, asking questions about a guaranteed period, having an insufficient understanding, requesting an accurate visit time, supervising through a third party, and withdrawing the service during the responding persons visit.

15. The method as claimed in claim 10, wherein the customer having the negative sensitivity is a customer having at least one from receiving no visit at a time requested by the customer, having repeated troubles of a product, distrusting a technical ability, being dissatisfied with traveling/repairing charges, being dissatisfied with collection of phone call charges, being dissatisfied with frequent call-disconnection, having difficulty in calling, being impatient in character, taking a promise/confidence seriously, having a hard-grained character, requesting another responding person, distrusting products, being dissatisfied with components of the product, having a reception omitted, and having excessive repairing experiences.

16. The method as claimed in claim 10, further comprising:
- confirming an area where the customer is positioned and a time zone for providing a response to the customer's request;
- obtaining schedule information of possible responding persons in charge of a service field requested by the customer among a plurality of responding persons who are allocated with the corresponding area as their service providing area;
- extracting information on the responding persons who are not responding in the time zone when the customer wants to receive the response based on the obtained schedule information;
- displaying the extracted information on the responding persons on a terminal of the corresponding customer, and requesting the customer to select a specified responding person from whom the customer wants to receive the response among the displayed responding persons; and
- registering in a database information on an additional schedule of the selected responding person along with response particulars concerning the response to the customer's request.

17. The method as claimed in claim 11, further comprising:
- classifying the collected customer sensitivity information into categories;
- confirming a code of a classified category corresponding to the customer's sensitivity;
- registering in the database information concerning the customer's request and information concerning the confirmed code of the classified category; and
- informing the responding person of the registered information and the at least one behavioral pattern based on the confirmed code.

18. The method as claimed in claim 17, further comprising:

responding to the customer's request using the registered information and the at least one behavioral pattern; and informing a result of the response to an information collection server after completion of the service.

19. The method as claimed in claim 18, further comprising transferring the registered information and the at least one behavioral pattern using a PDA, an e-mail, a direct call with a phone, a voice-mail box or a short message service.

20. The method as claimed in claim 18, further comprising informing in advance a visit schedule to the customer before the responding person visits the customer.

21. The method as claimed in claim 20, wherein when informing in advance the visit schedule to the customer, the responding person informs the visit schedule based on the at least one behavioral pattern determined to cope with the customer's sensitivity classification.

22. The method as claimed in claim 18, further comprising judging again the customer's sensitivity.

23. The method as claimed in claim 22, wherein information about the customer's sensitivity gathered by the responding person is informed to an information receiving network along with a result of the response to the request when the response is completed.

24. The method as claimed in claim 10, further comprising:

informing information about a completion of the response provided to the customer from the responding person;

confirming a recent customer's satisfaction with the provided response based on an informed result; and storing the recent customer's satisfaction information.

25. The method as claimed in claim 24, wherein confirming the recent customer's satisfaction comprises:

if it is confirmed that the response is completed, transferring to the customer a message for confirming the satisfaction with the provided response; and if a reply to the transferred message is received from the customer, confirming the satisfaction of the customer by analyzing contents of the replied message.

26. The method as claimed in claim 25, wherein the message transferred to the customer includes at least one from questions, repeated troubles, a kindness of the responding person, particulars to be requested to the customer, the response to the particulars requested by the customer, and guidance of events.

27. The method as claimed in claim 25, wherein the message is transferred to the customer using e-mail, the Internet, or a short message service on a mobile communication network.

28. The method as claimed in claim 27, wherein questions included in the e-mail are presented in a form of an inquiry.

29. The method as claimed in claim 27, further comprising providing a predetermined incentive to the customer if the customer sends a reply in response to the inquiry included in the e-mail.

30. The method as claimed in claim 25, wherein transferring the message comprises:

inputting the message to be transferred to the customer;

selecting a specified data communication network to which the customer belongs;

entering a message sender and phone number for reply; and sending the message to the customer through the corresponding data communication network.

31. The method as claimed in claim 30, wherein the message sender is a customer service center having an area where the customer resides as its jurisdiction area, and the phone number for response is an ARS system of the customer service center for confirming the customer's satisfaction or a phone number of a person in charge of the customer service center.

32. The method as claimed in claim 25, further comprising:

confirming the satisfaction of the customer according to the provided response by making a phone call to the customer before the message for confirming the satisfaction of the provided response is transferred to the customer after the response is completed; and transferring the message for confirming the customer's satisfaction to the customer if the phone call is refused or the customer is absent when confirming the customer's satisfaction.

33. The method as claimed in claim 25, wherein transferring the message further comprises:

confirming whether an event in the company providing the response occurs; and if it is confirmed that the event occurs, appending a brief explanation of the event to the message to be transferred.

34. The method as claimed in claim 25, further comprising:

classifying the contents of the message into terms according to degrees of satisfaction; and storing the classified terms.

35. The method as claimed in claim 34, wherein the stored classified terms are simple satisfaction, questions about how-to-use and repeated trouble, and impression.

36. The method as claimed in claim 25, wherein the customer replies to the message using at least one from a phone call, a short message service, an e-mail service, and ARS service.

37. The method as claimed in claim 10, further comprising:

confirming an area where a customer is located and a service providing time if a customer initiates a request;

obtaining schedule information of possible responding persons in charge of a field of the customer's request among responding persons which designate a corresponding area as their providing area;

extracting information on responding persons which have time to spare when the customer desires to receive the response based on the obtained information;

displaying information on the extracted responding persons on a terminal of the customer, and requesting the customer to select a specified responding person from which the customer wants; and informing information concerning the customer's request to the selected responding person.

38. The method as claimed in claim 37, further comprising receiving information on a current response progress state from the selected responded person during the progress of the response, and storing the received information in a database.

39. The method as claimed in claim 37, further comprising updating information on a reservation state at a response providing time zone requested by the customer in schedule information particulars of the selected responding person during progress of the response.

40. The method as claimed in claim 37, further comprising requesting the responding persons to register respective schedule information before starting their schedules, and registering in a database the registered schedule information in response to the request.

* * * * *